US012701149B2

(12) United States Patent
Zhang et al.

(10) Patent No.: US 12,701,149 B2
(45) Date of Patent: Aug. 4, 2026

(54) DEVICE, METHOD, AND MEDIUM FOR RECOMMENDING SERVICE, ELECTRONIC DEVICE, AND SYSTEM

(71) Applicant: Huawei Technologies Co., Ltd., Shenzhen (CN)

(72) Inventors: Yanan Zhang, Shenzhen (CN); Whan Woong Kim Stransom, Shenzhen (CN); Yuzhuo Peng, Shenzhen (CN); Xuan Zhou, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 539 days.

(21) Appl. No.: 17/916,631

(22) PCT Filed: Mar. 23, 2021

(86) PCT No.: PCT/CN2021/082394
    § 371 (c)(1),
    (2) Date: Oct. 3, 2022

(87) PCT Pub. No.: WO2021/197139
    PCT Pub. Date: Oct. 7, 2021

(65) Prior Publication Data
    US 2023/0140946 A1      May 11, 2023

(30) Foreign Application Priority Data

Apr. 2, 2020    (CN) .......................... 202010255530.6

(51) Int. Cl.
    *H04L 65/1069*        (2022.01)
    *G06F 21/31*          (2013.01)
    (Continued)

(52) U.S. Cl.
    CPC .......... *H04L 65/1069* (2013.01); *G06F 21/31* (2013.01); *G06Q 20/0855* (2013.01); *G06Q 30/0631* (2013.01); *G06Q 30/0643* (2013.01)

(58) Field of Classification Search
    CPC . H04L 65/1069; G06F 21/31; G06Q 20/0855; G06Q 30/0631; G06Q 30/0643;
    (Continued)

(56) References Cited

U.S. PATENT DOCUMENTS

2013/0237147 A1*   9/2013   Dearman .............. G06F 9/5055
                                                    455/41.1
2016/0173679 A1*   6/2016   Ham ..................... H04W 24/08
                                                    709/220
(Continued)

FOREIGN PATENT DOCUMENTS

CN        108541378 A      9/2018
CN        110868640 A      3/2020
EP        3009972 A1       4/2016

OTHER PUBLICATIONS

Cam Scott, Cross-device experiences with Project Rome, Windows Developer Blog, Oct. 11, 2016 (Year: 2016).*
(Continued)

*Primary Examiner* — Marissa Thein
*Assistant Examiner* — Anna Mae Mitros
(74) *Attorney, Agent, or Firm* — Conley Rose, P.C.

(57)                    ABSTRACT

A first electronic device determines a second electronic device within a preset distance when the first electronic device determines, based on a mapping relationship, that a first task that is being executed is not a task that is suitable for being executed by a device type of the first electronic device. The first electronic device receives first information, from the second electronic device, that includes information about a device identifier and a device type of the second electronic device. The first electronic device determines, (Continued)

based on the device identifier and the device type, that the second electronic device is suitable for executing the first task. The first electronic device sends a recommended service corresponding to the first task to the second electronic device. The second electronic device displays prompt information corresponding to the recommended service on a display.

20 Claims, 29 Drawing Sheets

(51) Int. Cl.
*G06Q 20/08*       (2012.01)
*G06Q 30/0601*      (2023.01)

(58) Field of Classification Search
CPC .......... G06Q 30/0601–0645; G06Q 30/06311;
           G06Q 30/06312; G06Q 30/06313; G06Q
           30/06314; G06Q 30/06315; G06Q
           30/06432; G06Q 30/06433; G06Q
           30/06434; G06Q 30/06435; G06Q
           30/0644; G06Q 30/06442; G06Q
           30/06443; G06Q 30/06444
USPC ...................................... 705/26.1–27.2, 26.7
See application file for complete search history.

(56) References Cited

U.S. PATENT DOCUMENTS

| | | | |
|---|---|---|---|
| 2017/0111494 A1* | 4/2017 | Kidron | H04L 67/51 |
| 2018/0268232 A1* | 9/2018 | Kim | G06V 40/13 |
| 2018/0300391 A1 | 10/2018 | San Vicente et al. | |
| 2019/0324703 A1 | 10/2019 | Rakshit et al. | |

OTHER PUBLICATIONS

Anonymous: "Pick up where you left off with Handoff on Mac—Apple Support", Dec. 15, 2019 (Dec. 15, 2019), XP093058737, Retrieved from the Internet: URL:https://web.archive.org/web/20191215005648/https://support.apple.com/en-gb/guide/mac-help/mchl732d3c0a/mac, Retrieved Aug. 7, 2024, 2 pages.

Anonymous: "Start or join a family group using Family Sharing—Apple Support", Jan. 8, 2015 (Jan. 8, 2015), XP055364112, Retrieved from the Internet: URL:https://web-beta.archive.org/web/20150108110337/http://support.apple.com:80/en-us/ht201088, Retrieved Aug. 7, 2024, 6 pages.

Apple Support Community, Pick up where you left off with Handoff on Mac, Download on Apr. 2, 2025, total 2 pages.

* cited by examiner

Not process after preset duration

Type: Movie

Directors: Zhou Shen, Liu Lu

Starring: Ren Suxi, Wu Yuhan, Liu Xun, and Tang Min

Almost a Comedy

Back

Purchase to watch

Purchase to watch a full version

Cancel

Purchase with
CNY 5

Purchase with CNY 5
Select a payment method

Method 1: Pay by
scanning a QR code

Method 2: Pay by using
a surrounding device

Lee's P30

Laura's Mate30

Laura's HW Watch

Smart TV to which a Huawei ID of Lee is logged in

~
TO

CONT.
FROM

~

Mobile phone to which the Huawei ID of Lee is logged in
~
TO

CONT. FROM

Tablet computer to which a Huawei ID of Laura is logged in

Smart TV to which a Huawei ID of Lee is logged in

~
TO

CONT.
FROM

Mobile phone to which the Huawei ID of Lee is logged in

TO

CONT. FROM

DEVICE, METHOD, AND MEDIUM FOR RECOMMENDING SERVICE, ELECTRONIC DEVICE, AND SYSTEM

CROSS-REFERENCE TO RELATED APPLICATIONS

This is a U.S. National Stage of International Patent Application No. PCT/CN2021/082394 filed on Mar. 23, 2021, which claims priority to Chinese Patent Application No. 202010255530.6 filed on Apr. 2, 2020. Both of the aforementioned applications are hereby incorporated by reference in their entireties.

TECHNICAL FIELD

This application relates to the field of terminals, and more specifically, to a method for recommending a service, an electronic device, and a system.

BACKGROUND

Currently, cross-device recommendation of a service between terminal devices depends on a same user ID. For example, cross-device recommendation of a service between Apple devices requires logging in a same user ID (Apple ID) to two devices. In addition, currently, a scenario for cross-device recommendation of the service is limited, including a limited quantity of scenarios such as payment.

Because the devices need to depend on the same user ID and the scenario for cross-device recommendation of the service is limited, problems like complex operations may compromise user experience.

SUMMARY

This application provides a method for recommending a service, and an electronic device, to help improve operation efficiency of a user and a degree of intelligence of the electronic device, and help improve user experience.

According to a first aspect, a system is provided. The system includes a first electronic device and a second electronic device. The first electronic device is an electronic device to which a first user ID is logged in. The first electronic device stores a mapping relationship between a plurality of device types and a task type that is suitable for being executed by each of the plurality of device types. The plurality of device types include a device type of the first electronic device and a device type of a second electronic device. The first electronic device is configured to determine the second electronic device within a preset distance when the first electronic device determines, based on the mapping relationship, that a first task that is being executed is not a task that is suitable for being executed by the device type of the first electronic device. The first electronic device is further configured to receive first information sent by the second electronic device. The first information includes information about a device identifier and the device type of the second electronic device. The first electronic device is further configured to determine, based on the device identifier of the second electronic device, that a second user ID logged in to the second electronic device is associated with the first user ID. The first electronic device stores information about a device identifier of an electronic device associated with the second user ID. The electronic device associated with the second ID includes the second electronic device. The first electronic device is further configured to determine, based on the device type of the second electronic device and the mapping relationship, that the second electronic device is an electronic device that is suitable for executing the first task. The first electronic device is further configured to send a recommended service corresponding to the first task to the second electronic device. The recommended service includes information about a task type corresponding to the first task and service content. The second electronic device is configured to display an icon of the recommended service on a display of the second electronic device, or the second electronic device is configured to display a semi-modal card on the display. The semi-modal card includes the service content.

In this embodiment of this application, the first electronic device may store the mapping relationship between the plurality of device types and the task type that is suitable for being executed by each device type. When the first electronic device determines that a task that is being executed currently is not the task type that is suitable for being executed by the first electronic device, the first electronic device may determine the second electronic device that is suitable for executing the first task within a preset range, and send the recommended service corresponding to the first task to the second electronic device. In this way, a user can execute the first task on the second electronic device that is more suitable for executing the first task, and complexity of operation by the user is reduced, to improve user experience. In addition, the first electronic device and the second electronic device do not need to depend on a same user ID, provided that the second user ID logged in to the second electronic device is related to the first user ID logged in to the first electronic device. In this way, when performing cross-device recommendation of a service, the first electronic device may select a wider range of devices for recommendation, so that the first electronic device pushes the recommended service corresponding to the first task to a proper device in a timely manner.

With reference to the first aspect, in a possible implementation of the first aspect, the second electronic device is further configured to determine that the task type of the first task meets a preset condition before displaying the icon of the recommended service on the display of the second electronic device, or before displaying the semi-modal card by the second electronic device on the display. The second electronic device is further configured to perform authentication on a user who is using the second electronic device. The second electronic device is further configured to determine that the user authentication succeeds.

In this embodiment of this application, before displaying corresponding information on the display, the second electronic device may first determine whether the first task meets the preset condition. If the first task meets the preset condition, the second electronic device may first perform authentication on the user. In this way, some special tasks are prevented from being executed by another user other than the user, and security performance of the electronic device is improved.

In some possible implementations, that the task type of the first task meets the preset condition includes that the task type of the first task belongs to a private task. The private task may be a task having a high security level requirement, such as payment, authentication, unlocking, or notification processing. It should be understood that the electronic device may preset a mapping relationship between a task type and whether the task type belongs to a private task.

With reference to the first aspect, in a possible implementation of the first aspect, the first user ID and the second user ID are user IDs in a same family group, or the second user ID is a user ID authorized by the first user ID.

In this embodiment of this application, when the service is recommended between the first electronic device and the second electronic device, a same user ID does not need to be logged in to the first electronic device and the second electronic device. In this way, a range of electronic devices that can be selected by the first electronic device when the first electronic device recommends the service can be increased, to help the first electronic device recommend the service to a proper electronic device in a timely manner, reduce a delay in a service recommendation process, and improve the user experience.

With reference to the first aspect, in a possible implementation of the first aspect, the second electronic device is further configured to determine, before displaying the icon on the display, that the second electronic device is in a screen-off state or a screen-locked state, or to determine that the second electronic device is executing a task unrelated to the first task.

In this embodiment of this application, after receiving the recommended service, the second electronic device may determine a display manner on the display based on a state of the second electronic device. When the second electronic device is in the screen-off state or the screen-locked state, or executes the task unrelated to the first task, the second electronic device may display the icon. In this way, interference to the user can be avoided.

With reference to the first aspect, in a possible implementation of the first aspect, the second electronic device is further configured to determine, before displaying the semi-modal card on the display, that the second electronic device is in a screen-unlocked state and that the second electronic device is executing a task related to the first task, or to determine that the second electronic device establishes a connection relationship with the first electronic device before receiving the recommended service.

In this embodiment of this application, after receiving the recommended service, the second electronic device may determine the display manner on the display based on the state of the second electronic device. When the second electronic device is in the screen-unlocked state and the second electronic device is executing the task related to the first task, the semi-modal card may be displayed, to help the user process the first task in a timely manner, improve a speed of processing the first task by the user, and reduce operations of the user.

According to a second aspect, a method for recommending a service is provided. The method is applied to a first electronic device. The first electronic device is an electronic device to which a first user ID is logged in. The first electronic device stores a mapping relationship between a plurality of device types and a task type that is suitable for being executed by each of the plurality of device types. The plurality of device types include a device type of the first electronic device and a device type of a second electronic device. The method includes: The first electronic device determines the second electronic device within a preset distance when the first electronic device determines, based on the mapping relationship, that a first task that is being executed is not a task that is suitable for being executed by the device type of the first electronic device. The first electronic device receives first information sent by the second electronic device. The first information includes information about a device identifier and the device type of the second electronic device. The first electronic device determines, based on the device identifier of the second electronic device, that a second user ID logged in to the second electronic device is associated with the first ID, The first electronic device stores information about a device identifier of an electronic device associated with the second user ID. The electronic device associated with the second user ID includes the second electronic device. The first electronic device determines, based on the device type of the second electronic device and the mapping relationship, that the second electronic device is an electronic device that is suitable for executing the first task. The first electronic device sends a recommended service corresponding to the first task to the second electronic device.

In this embodiment of this application, the first electronic device may store the mapping relationship between the plurality of device types and the task type that is suitable for being executed by each device type. When the first electronic device determines that a task that is being executed currently is not the task type that is suitable for being executed by the first electronic device, the first electronic device may determine the second electronic device that is suitable for executing the first task within a preset range, and send the recommended service corresponding to the first task to the second electronic device. In this way, a user can execute the first task on the second electronic device that is more suitable for executing the first task, and complexity of operation by the user is reduced, to improve user experience. In addition, the first electronic device and the second electronic device do not need to depend on a same user ID, provided that the second user ID logged in to the second electronic device is related to the first user ID logged in to the first electronic device. In this way, when performing cross-device recommendation of a service, the first electronic device may select a wider range of devices for recommendation, so that the first electronic device pushes the recommended service corresponding to the first task to a proper device in a timely manner.

With reference to the second aspect, in a possible implementation of the second aspect, the plurality of device types further include a device type of a third device. Before that the first electronic device sends a recommended service corresponding to the first task to the second electronic device, the method further includes: The first electronic device receives second information sent by the third electronic device. The second information includes information about a device identifier and a device type of the third electronic device. The first electronic device determines, based on the device identifier of the third electronic device, that a third user ID logged in to the third electronic device is associated with the first user ID, The first electronic device stores information about a device identifier of an electronic device associated with the third user ID. The electronic device associated with the third user ID includes the third electronic device. The first electronic device determines, based on the device type of the third electronic device and the mapping relationship, that the third electronic device is an electronic device that is suitable for executing the first task. The first electronic device prompts a user with information about the second electronic device and information about the third electronic device on a display. The first electronic device detects an operation of selecting the second electronic device by the user.

In this embodiment of this application, when there are a plurality of electronic devices that are suitable for executing the first task around the first electronic device, the first electronic device may prompt the user to select a device to execute the first task. This helps the user learn, in a timely manner, which devices around are suitable for executing the first task, so that the user can accurately select a device for executing the first task.

In some possible implementations, the first electronic device may alternatively not prompt the user with the information about the second electronic device and the information about the third electronic device, but directly send the recommended service corresponding to the first task to the second electronic device and the third electronic device. Alternatively, the first electronic device may prompt the user with the information about the second electronic device and the information about the third electronic device. If the user does not select any one of the devices within preset duration, the first electronic device may send the recommended service corresponding to the first task to both the second electronic device and the third electronic device.

With reference to the second aspect, in a possible implementation of the second aspect, the first user ID and the second user ID are user IDs in a same family group, or the second user ID is a user ID authorized by the first user ID.

In this embodiment of this application, the first electronic device and the second electronic device do not need to depend on a same user ID, provided that the second user ID logged in to the second electronic device is related to the first user ID logged in to the first electronic device. In this way, when performing cross-device recommendation of a service, the first electronic device may select a wider range of devices for recommendation, so that the first electronic device pushes the recommended service corresponding to the first task to a proper device in a timely manner.

According to a third aspect, a method for recommending a service is provided. The method is applied to a second electronic device. The second electronic device includes a display. The method includes: The second electronic device receives a recommended service sent by a first electronic device within a preset distance. The recommended service includes information about a task type corresponding to a first task and service content. The first task is a task that is being executed by the first electronic device. The second electronic device performs, when determining that the task type of the first task meets a preset condition, authentication on a user who is using the second electronic device. After the user authentication by the second electronic device succeeds, the second electronic device displays an icon of the recommended service on the display, or the second electronic device displays a semi-modal card on the display. The semi-modal card includes the service content.

In this embodiment of this application, before displaying corresponding information on the display, the second electronic device may first determine whether the first task meets the preset condition. If the first task meets the preset condition, the second electronic device may first perform authentication on the user. In this way, some special tasks are prevented from being executed by another user other than the user, and security performance of the electronic device is improved.

With reference to the third aspect, in a possible implementation of the third aspect, the second electronic device stores a mapping relationship between the task type of the first task and whether the task type belongs to a private task. That the second electronic device determines that the task type of the first task meets a preset condition includes that the second electronic device determines, based on the mapping relationship, that the task type of the first task belongs to the private task.

In this embodiment of this application, when determining that the task type of the first task belongs to the private task, the second electronic device may first perform authentication on the user. In this way, some special tasks are prevented from being executed by another user other than the user, and security performance of the electronic device is improved.

For example, after receiving a recommended service of a private task when the second electronic device is in a screen-off state, the second electronic device may automatically complete authentication on the user (automatically enabling a camera to collect face information of the user, or collecting fingerprint information of the user) without turning on the screen. After the user authentication succeeds, the icon of the recommended service may be displayed in the screen-off state.

In some possible implementations, the private task may be a task having a high security level requirement, such as payment, authentication, unlocking, or notification processing.

With reference to the third aspect, in a possible implementation of the third aspect, before that the second electronic device displays an icon on the display, the method further includes: The second electronic device determines that the second electronic device is in a screen-off state or a screen-locked state, or the second electronic device determines that the second electronic device is executing a task unrelated to the first task.

In this embodiment of this application, after receiving the recommended service, the second electronic device may determine a display manner on the display based on a state of the second electronic device. When the second electronic device is in the screen-off state or the screen-locked state, or executes the task unrelated to the first task, the second electronic device may display the icon. In this way, interference to the user can be avoided.

With reference to the third aspect, in a possible implementation of the third aspect, before that the second electronic device displays a semi-modal card on the display, the method includes: The second electronic device determines that the second electronic device is in a screen-unlocked state and that the second electronic device is executing a task related to the first task, or the second electronic device determines that the second electronic device establishes a connection relationship with the first electronic device before receiving the recommended service.

In this embodiment of this application, after receiving the recommended service, the second electronic device may determine the display manner on the display based on the state of the second electronic device. When the second electronic device is in the screen-unlocked state and the second electronic device is executing the task related to the first task, the semi-modal card may be displayed, to help the user process the first task in a timely manner, improve a speed of processing the first task by the user, and reduce operations of the user.

With reference to the third aspect, in a possible implementation of the third aspect, the method further includes: The second electronic device receives information about a third electronic device sent by the first electronic device. The third electronic device is another electronic device that receives the recommended service. If the first task is not a task that is suitable for being simultaneously executed by a plurality of electronic devices, after the second electronic device detects that the user taps the icon, or after the second electronic device detects that the user taps the semi-modal card, the second electronic device sends indication information to the third electronic device. The indication information indicates the third electronic device to hide an icon or a semi-modal card displayed on the third electronic device.

In this embodiment of this application, if the second electronic device determines that the first task is not the task that is suitable for being simultaneously executed by the plurality of electronic devices, after detecting that the user taps the icon or the semi-modal card, the second electronic device may send the indication information to the third electronic device, to indicate the third electronic device to hide the icon or the semi-modal card. In this way, the first task can be prevented from being simultaneously executed by the plurality of devices.

In some possible implementations, the second electronic device stores a mapping relationship between a plurality of task types and whether each of the plurality of task types is suitable for being simultaneously executed by a plurality of devices.

With reference to the third aspect, in a possible implementation of the third aspect, the first task is a payment task, and there is no payment application in the second electronic device. The service content includes information about a commodity name and information about a commodity amount in the payment task. The method further includes: The second electronic device displays the commodity name, the commodity amount, and a payment control on the display after the second electronic device detects that the user taps the icon, or after the second electronic device detects that the user taps the semi-modal card. The second electronic device detects a second operation of tapping the payment control by the user. The second electronic device sends the information about the commodity name the information about and the commodity amount to a fourth electronic device in response to the second operation. A same user ID is logged in to the second electronic device and the fourth electronic device. The second electronic device receives a payment result sent by the fourth electronic device.

In this embodiment of this application, if no application for executing the first task is installed on the second electronic device, the second electronic device may also execute the first task on a proper device based on a distributed AA capability. For the foregoing payment scenario, the second electronic device on which no payment application is installed may send payment information to the fourth electronic device to which the same user ID is logged in as the second electronic device and on which a payment application is installed, and the fourth electronic device replaces the second electronic device to complete the payment task.

According to a fourth aspect, this technical solution provides an apparatus for recommending a service. The apparatus is included in an electronic device. The apparatus has a function of implementing a behavior of the first electronic device in the second aspect and the possible implementations of the second aspect. The function may be implemented by hardware, or may be implemented by executing corresponding software by hardware. The hardware or the software includes one or more modules or units corresponding to the foregoing function.

According to a fifth aspect, this technical solution provides an apparatus for recommending a service. The apparatus is included in an electronic device. The apparatus has a function of implementing a behavior of the second electronic device in the third aspect and the possible implementations of the third aspect. The function may be implemented by hardware, or may be implemented by executing corresponding software by hardware. The hardware or the software includes one or more modules or units corresponding to the foregoing function.

According to a sixth aspect, an electronic device is provided, including one or more processors and one or more memories. The one or more memories are coupled to the one or more processors. The one or more memories are configured to store computer program code. The computer program code includes computer instructions. When the one or more processors execute the computer instructions, the electronic device performs the method for recommending a service in any possible implementation of the second aspect.

According to a seventh aspect, an electronic device is provided, including one or more processors and one or more memories. The one or more memories are coupled to the one or more processors. The one or more memories are configured to store computer program code. The computer program code includes computer instructions. When the one or more processors execute the computer instructions, the electronic device performs the method for recommending a service in any possible implementation of the third aspect.

According to an eighth aspect, this technical solution provides a computer storage medium. The computer storage medium includes computer instructions. When the computer instructions are run on an electronic device, the electronic device is enabled to perform the method for recommending a service in any one of the second aspect, the third aspect, and the possible implementations of the second aspect and the third aspect.

According to a ninth aspect, this technical solution provides a computer program product. When the computer program product runs on an electronic device, the electronic device is enabled to perform the method for recommending a service in any one of the second aspect, the third aspect, and the possible implementations of the second aspect and the third aspect.

BRIEF DESCRIPTION OF DRAWINGS

FIG. 9A, FIG. 913, and FIG. 9C show a still further group of GUIs according to an embodiment of this application;

DESCRIPTION OF EMBODIMENTS

The following describes the technical solutions in embodiments of this application with reference to the accompanying drawings in embodiments of this application. In description in embodiments of this application, "i" means "or" unless otherwise specified. For example, A/B may represent A or B. In this specification, "and; or" describes only an association relationship for describing associated objects and represents that three relationships may exist. For example, A and; or B may represent the following three cases: Only A exists, both A and B exist, and only B exists. In addition, in the description in embodiments of this application, "a plurality of" means two or more than two.

The terms "first" and "second" mentioned below are merely intended for a purpose of description, and shall not be understood as an indication or implication of relative importance or implicit indication of a quantity of indicated technical features. Therefore, a feature limited by "first" or "second" may explicitly or implicitly include one or more such features. In the descriptions of embodiments, unless otherwise specified, "a plurality of" means two or more.

A method provided in embodiments of this application may be applied to an electronic device, for example, a mobile phone, a tablet computer, a wearable device, a vehicle-mounted device, an augmented reality (augmented reality, AR) device/a virtual reality (virtual reality, VR) device, a notebook computer, an ultra-mobile personal computer (ultra-mobile personal computer, UMPC), a netbook, or a personal digital assistant (personal digital assistant, PDA). A specific type of the electronic device is not limited in embodiments of this application.

Figure 1:
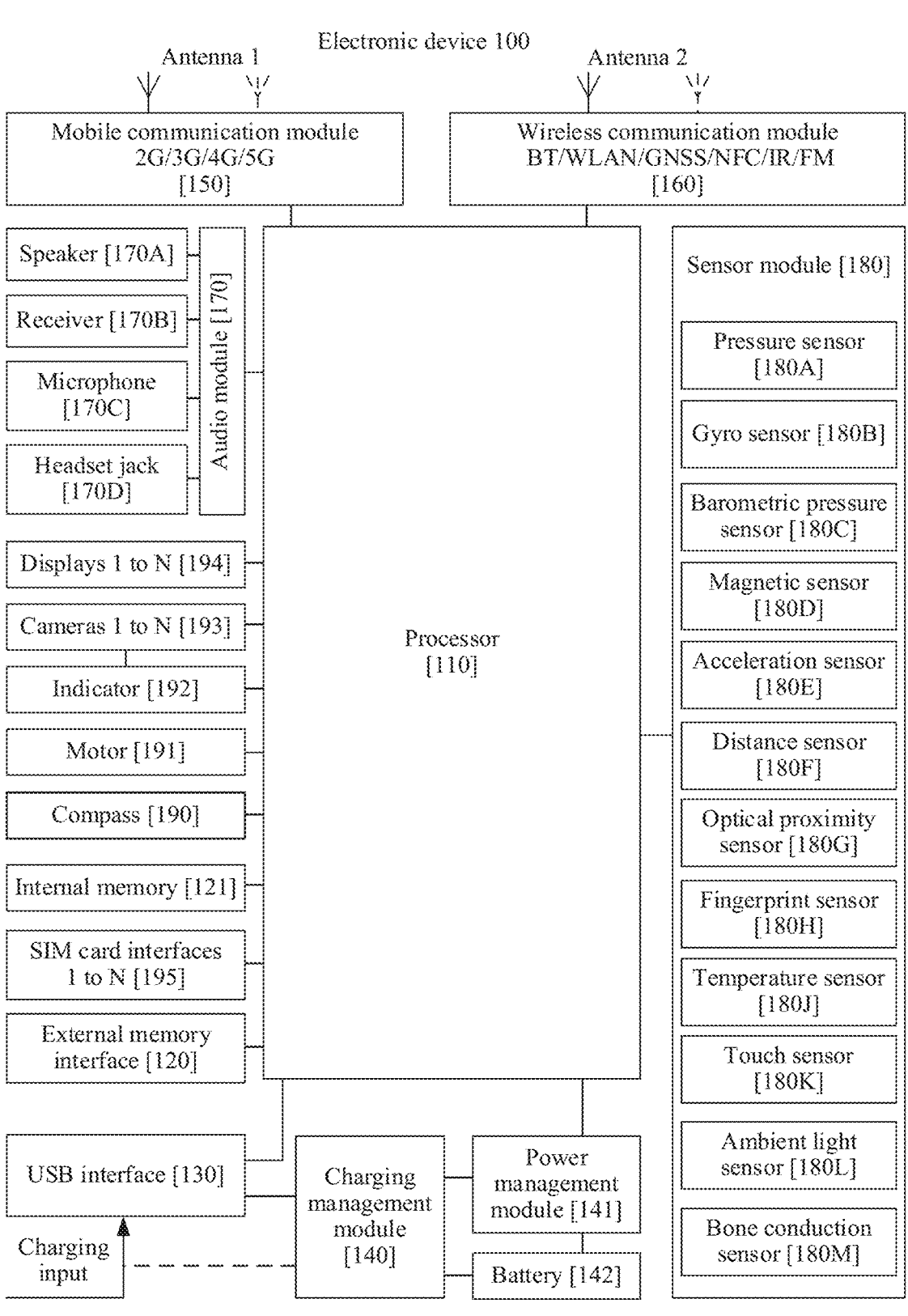
FIG. 1 is a schematic diagram of a structure of an electronic device according to an embodiment of this application.

For example, FIG. 1 is a schematic diagram of a structure of an electronic device 100. The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application constitutes no specific limitation on the electronic device 100. In some other embodiments of this application, the electronic device 100 may include more or fewer components than those shown in the figure, some components may be combined, or some components may be split, or there may be a different component layout. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may be a nerve center and a command center of the electronic device 100. The controller may generate an operation control signal based on an instruction operation code and a time sequence signal, to complete control of instruction fetching and instruction execution.

A memory may be further disposed in the processor 110, and is configured to store instructions and data. In some embodiments, the memory in the processor 110 is a cache memory. The memory may store instructions or data just used or cyclically used by the processor 110, If the processor 110 needs to use the instructions or the data again, the processor may directly invoke the instructions or the data from the memory. This avoids repeated access and reduces waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and; or the like.

The I2C interface is a two-way synchronous serial bus, and includes one serial data line (serial data line, SDA) and one serial clock line (serial clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K, through the I2C interface, so that the processor 110 communicates with the touch sensor 180K, through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call by using a Bluetooth headset.

The PCM interface may also be configured to perform audio communication, and sample, quantize, and encode an analog signal. In some embodiments, the audio module 170 may, be coupled to the wireless communication module 160 through a PCM bus interface. In some embodiments, the audio module 170 may also transmit an audio signal to the wireless communication module 160 through the PCM interface, to implement a function of answering a call by using a Bluetooth headset. Both the I2S interface and the PCM interface may be configured to perform audio communication.

The UART interface is a universal serial data bus, and is configured to perform asynchronous communication. The bus may be a two-way communication bus. The bus converts to-be-transmitted data between serial communication and parallel communication. In some embodiments, the UART interface is usually configured to connect the processor 110 to the wireless communication module 160. For example, the processor 110 communicates with the Bluetooth module in the wireless communication module 160 through the UART interface, to implement a Bluetooth function. In some embodiments, the audio module 170 may transmit an audio signal to the wireless communication module 160 through the UART interface, to implement a function of playing music by using a Bluetooth headset.

The MIPI may be configured to connect the processor 110 to a peripheral component such as the display 194 or the camera 193. The MIPI includes a camera serial interface (camera serial interface, CSI), a display serial interface (display serial interface, DSI), and the like. In some embodiments, the processor 110 communicates with the camera 193 through the CST, to implement a photographing function of the electronic device 100. The processor 110 communicates with the display 194 through the DSI, to implement a display function of the electronic device 100.

The GPIO interface may be configured by software. The GPIO interface may be configured as a control signal or a data signal. In some embodiments, the GPIO interface may be configured to connect the processor 110 to the camera 193, the display 194, the wireless communication module 160, the audio module 170, the sensor module 180, or the like. The GPIO interface may be alternatively configured as an I2C interface, an I2S interface, a UART interface, a MIPI, or the like.

The USB interface 130 is an interface that conforms to a USB standard specification, and may be specifically a mini USB interface, a micro USB interface, a USB type-C interface, or the like. The USB interface 130 may be configured to connect to a charger to charge the electronic device 100, or may be configured to transmit data between the electronic device 100 and a peripheral device. The USB interface 130 may be alternatively configured to connect to a headset, to play audio by using the headset. The interface may be alternatively configured to connect to another electronic device, for example, an AR device.

It may be understood that an interface connection relationship between the modules illustrated in this embodiment of this application is merely an example for description, and constitutes no limitation on the structure of the electronic device 100. In some other embodiments of this application, the electronic device 100 may alternatively use an interface connection manner different from that in the foregoing embodiment, or a combination of a plurality of interface connection manners.

The charging management module 140 is configured to receive a charging input from the charger. The charger may be a wireless charger or a wired charger. In some embodiments of wired charging, the charging management module 140 may receive a charging input from the wired charger through the USB interface 130. In some embodiments of wireless charging, the charging management module 140 may receive a wireless charging input through a wireless charging coil of the electronic device 100. The charging management module 140 supplies power to the electronic device by using the power management module 141 while charging the battery 142.

The power management module 141 is configured to connect to the battery 142, the charging management module 140, and the processor 110. The power management module 141 receives an input from the battery 142 and/or the charging management module 140, and supplies power to the processor 110, the internal memory 121, an external memory, the display 194, the camera 193, the wireless communication module 160, and the like. The power management module 141 may be further configured to monitor parameters such as a battery capacity, a battery cycle count, and a battery health status (electric leakage or impedance). In some other embodiments, the power management module 141 may be alternatively disposed in the processor 110. In some other embodiments, the power management module 141 and the charging management module 140 may be alternatively disposed in a same device.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be further multiplexed, to improve antenna utilization. For example, the antenna 1 may be multiplexed as a diversity antenna of a wireless local area network. In some other embodiments, an antenna may be used in combination with a tuning switch.

The mobile communication module 150 may provide a solution that is applied to the electronic device 100 and that includes wireless communication such as 2G, 3G, 4G, and 5G. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit a processed electromagnetic wave to the modem processor for demodulation. The mobile communication module 150 may further amplify a signal modulated by the modem processor, and convert an amplified signal into an electromagnetic wave for radiation through the antenna 1. In some embodiments, at least some function modules of the mobile communication module 150 may be disposed in the processor 110. In some embodiments, at least some function modules of the mobile communication module 150 may be disposed in a same device as at least some modules of the processor 110.

The modem processor may include a modulator and a demodulator. The modulator is configured to modulate a to-be-sent low-frequency baseband signal into a medium-/high-frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transmits a processed signal to the application processor. The application processor outputs a sound signal by using an audio device (which is not limited to the speaker 170A, the receiver 170B, and the like), or displays an image or a video on the display 194. In some embodiments, the modem processor may be an independent component. In some other embodiments, the modem processor may be independent of the processor 110, and is disposed in a same component as the mobile communication module 150 or another function module.

The wireless communication module 160 may provide a solution that is applied to the electronic device 100 and that includes wireless communication such as a wireless local area network (wireless local area network, WL AN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NH), and an infrared (infrared, IR) technology. The wireless communication module 160 may be one or more components integrating at least one communication processor module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert a processed signal into an electromagnetic wave for radiation through the antenna 2.

In some embodiments, in the electronic device 100, the antenna 1 and the mobile communication module 150 are coupled, and the antenna 2 and the wireless communication module 160 are coupled, so that the electronic device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a. GNSS, a. MILAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation systems, SBAS).

The electronic device 100 implements a display function by using the GPU, the display 194, the application processor, and the like. The GPU is a microprocessor for image processing, and is connected to the display 194 and the application processor. The GPU is configured to perform mathematical and geometrical calculation, and is configured to perform graphics rendering. The processor 110 may include one or more GPUs, which execute program instructions to generate or change display information.

The display 194 is configured to display an image, a video, and the like. The display 194 includes a display panel. The display panel may use a liquid crystal display (liquid crystal display, LCD), an organic light-emitting diode (organic light-emitting diode, OLED), an active-matrix organic light-emitting diode (active-matrix organic light emitting diode, AMOLED), a flexible light-emitting diode (flex light-emitting diode, FLED), a mini-LED, a micro-LED, a micro-OLED, a quantum dot light-emitting diode (quantum dot light emitting diode, QLED), or the like. In some embodiments, the electronic device 100 may include one or N displays 194, where N is a positive integer greater than 1.

The electronic device 100 may implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 may be configured to capture a static image or a video. An optical image of an object is generated through the lens, and is projected to the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts the optical signal into the electrical signal, and then transmits the electrical signal to the ISP to convert the electrical signal into a digital image signal. The ISP outputs the digital image signal to the DSP for processing. The DSP converts the digital image signal into an image signal in a standard format, for example, RGB or YIN In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transform or the like on frequency energy.

The video codec is configured to compress or decompress a digital video. The electronic device 100 may support one or more video codecs. In this way, the electronic device 100 can play or record videos in a plurality of encoding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a mode of transfer between human brain neurons, and may further continuously, perform self-learning. Applications such as intelligent cognition of the electronic device 100, for example, image recognition, facial recognition, speech recognition, and text understanding, may be implemented by using the NPU.

The external memory interface 120 may be configured to connect to an external storage card, for example, a micro SD card, to extend a storage capability of the electronic device 100. The external storage card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 runs the instructions stored in the internal memory 121, to perform various function applications of the electronic device 100 and data processing. The internal memory 121 may include a program storage area and a data storage area. The program storage area may store an operating system, an application required by at least one function (for example, a voice playing function or an image playing function), and the like. The data storage area may store data (such as audio data and an address book) created during use of the electronic device 100, and the like. In addition, the internal memory 121 may include a high-speed random access memory, or may include a non-volatile memory, for example, at least one magnetic disk storage device, a flash memory, or a universal flash storage (universal flash storage, UFS).

The electronic device 100 may implement an audio function, for example, music playing and recording, by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to code and decode an audio signal. In some embodiments, the audio module 170 may be disposed in the processor 110, or some function modules of the audio module 170 are disposed in the processor 110.

The speaker 170A, also referred to as a "loudspeaker", is configured to convert an audio electrical signal into a sound signal. The electronic device 100 may be used to listen to music or answer a call in a hands-free mode by using the speaker 170A.

The receiver 170B, also referred to as an "earpiece", is configured to convert an audio electrical signal into a sound signal. When the electronic device 100 is used to answer a call or receive voice information, the receiver 170B may be placed close to a human ear to listen to a voice.

The microphone 170C, also referred to as a "mike" or a "c", is configured to convert a sound signal into an electrical signal. When making a call or sending voice information, a user may make a sound near the microphone 170C through the mouth of the user, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 1700 may be alternatively disposed in the electronic device 100, to collect a sound signal, implement noise reduction, and recognize a sound source, to implement a directional recording function and the like.

The headset jack 170D is configured to connect to a wired headset. The headset jack 170D may be the USB interface 130 or may be a 3.5 mm open mobile terminal platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. Capacitance between electrodes changes when a force is applied to the pressure sensor 180k The electronic device 100 determines pressure intensity based on a capacitance change. When a touch operation is performed on the display 194, the electronic device 100 detects intensity of the touch operation by using the pressure sensor 180k The electronic device 100 may also calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on an SMS message application icon, an instruction for viewing an SMS message is performed. When a touch operation whose touch operation intensity is greater than or equal to the first pressure threshold is performed on the SMS message application icon, an instruction for creating a new SMS message is performed.

The gyro sensor 180B may be configured to determine a moving posture of the electronic device 100. In some embodiments, an angular velocity of the electronic device 100 around three axes (namely, axes x, y, and z) may be determined by using the gyro sensor 180B. The gyro sensor 180B may be configured to implement image stabilization during photographing. For example, when the shutter is pressed, the gyro sensor 180B detects an angle at which the electronic device 100 jitters, obtains, through calculation based on the angle, a distance for which a lens module needs to compensate, and allows the lens to cancel the jitter of the electronic device 100 through reverse motion, to implement image stabilization. The gyro sensor 180B may also be used in a navigation scenario and a somatic game scenario.

The barometric pressure sensor 180C is configured to measure barometric pressure. In some embodiments, the electronic device 100 calculates an altitude based on a barometric pressure value measured by the barometric pressure sensor 180C, to assist in positioning and navigation.

The magnetic sensor 180D includes a Hall sensor. The electronic device 100 may detect opening and closing of a flip cover or a smart cover by using the magnetic sensor 180D. In some embodiments, when the electronic device 100 is a flip phone, the electronic device 100 may detect opening and closing of a flip cover by using the magnetic sensor 180D. Further, a feature such as automatic unlocking upon opening of the flip cover is set based on a detected opening or closing state of the smart cover or a detected opening or closing state of the flip cover.

The acceleration sensor 180E may detect accelerations in various directions (usually on three axes) of the electronic device 100. When the electronic device 100 is still, a magnitude and a direction of gravity may be detected. The acceleration sensor 180E may be further configured to recognize a posture of the electronic device, and is used in application such as switching between a landscape mode and a portrait mode or a pedometer.

The distance sensor 180F is configured to measure a distance. The electronic device 100 may measure a distance in an infrared manner or a laser manner. In some embodiments, in a photographing scenario, the electronic device 100 may measure a distance by using the distance sensor 180F, to implement quick focusing.

The optical proximity sensor 180E may include, for example, a light-emitting diode (LED) and an optical detector, for example, a photodiode. The light emitting diode may be an infrared light emitting diode. The electronic device 100 emits infrared light by using the light-emitting diode. The electronic device 100 uses the photodiode to detect infrared reflected light from an object nearby. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that a user holds the electronic device 100 close to an ear for a call, to automatically turn off a screen for power saving. The optical proximity sensor 180G may also be configured to automatically unlock and lock the screen in a smart cover mode or a pocket mode.

The ambient light sensor 180L, is configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 reduces performance of a processor nearby the temperature sensor 180J, to reduce power consumption for thermal protection. In some other embodiments, when the temperature is less than another threshold, the electronic device 100 heats the battery 142 to prevent the electronic device 100 from being shut down abnormally due to a low temperature. In some other embodiments, when the temperature is lower than still another threshold, the electronic device 100 boosts an output voltage of the battery 142 to avoid abnormal shutdown caused by a low temperature.

The touch sensor 180K is also referred to as a touch panel. The touch sensor 180K may be disposed on the display 194. The touch sensor 180K and the display 194 constitute a touchscreen that is also referred to as a "touch screen". The touch sensor 180K is configured to detect a touch operation performed on or near the touch sensor 180K. The touch sensor may transfer the detected touch operation to the application processor to determine a type of a touch event. A visual output related to the touch operation may be provided through the display 194. In some other embodiments, the touch sensor 180K may also be disposed on a surface of the electronic device 100 at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse to receive a blood pressure beating signal. In some embodiments, the bone conduction sensor 180M may also be disposed in the headset, to obtain a bone conduction headset. The audio module 170 may obtain a speech signal through parsing based on the vibration signal that is of the vibration bone of the vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a button input, and generate a button signal input related to user setting and function control of the electronic device 100.

The motor 191 may generate a vibration prompt. The motor 191 may be configured to provide an incoming call vibration prompt and a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support 1 or N SIM card interfaces, where N is a positive integer greater than 1. The SIM card interface 195 may support a nano-SIM card, a micro-SIM card, a SIM card, and the like. A plurality of cards may be inserted into a same SIM card interface 195. The plurality of cards may be of a same type or different types. The SIM card interface 195 may be compatible with different types of SIM cards. The SIM card interface 195 may also be compatible with an external storage card. The electronic device 100 interacts with a network by using the SIM card, to implement functions such as calling and data communication. In some embodiments, the electronic device 100 uses an eSIM, namely, an embedded SIM card. The eSIM card may be embedded into the electronic device 100, and cannot be separated from the electronic device 100.

A software system of the electronic device 100 may use a layered architecture, an event-driven architecture, a micro-kernel architecture, a micro service architecture, or a cloud architecture. In embodiments of this application, an Android system with a layered architecture is used as an example to describe a software structure of the electronic device 100.

Figure 2:
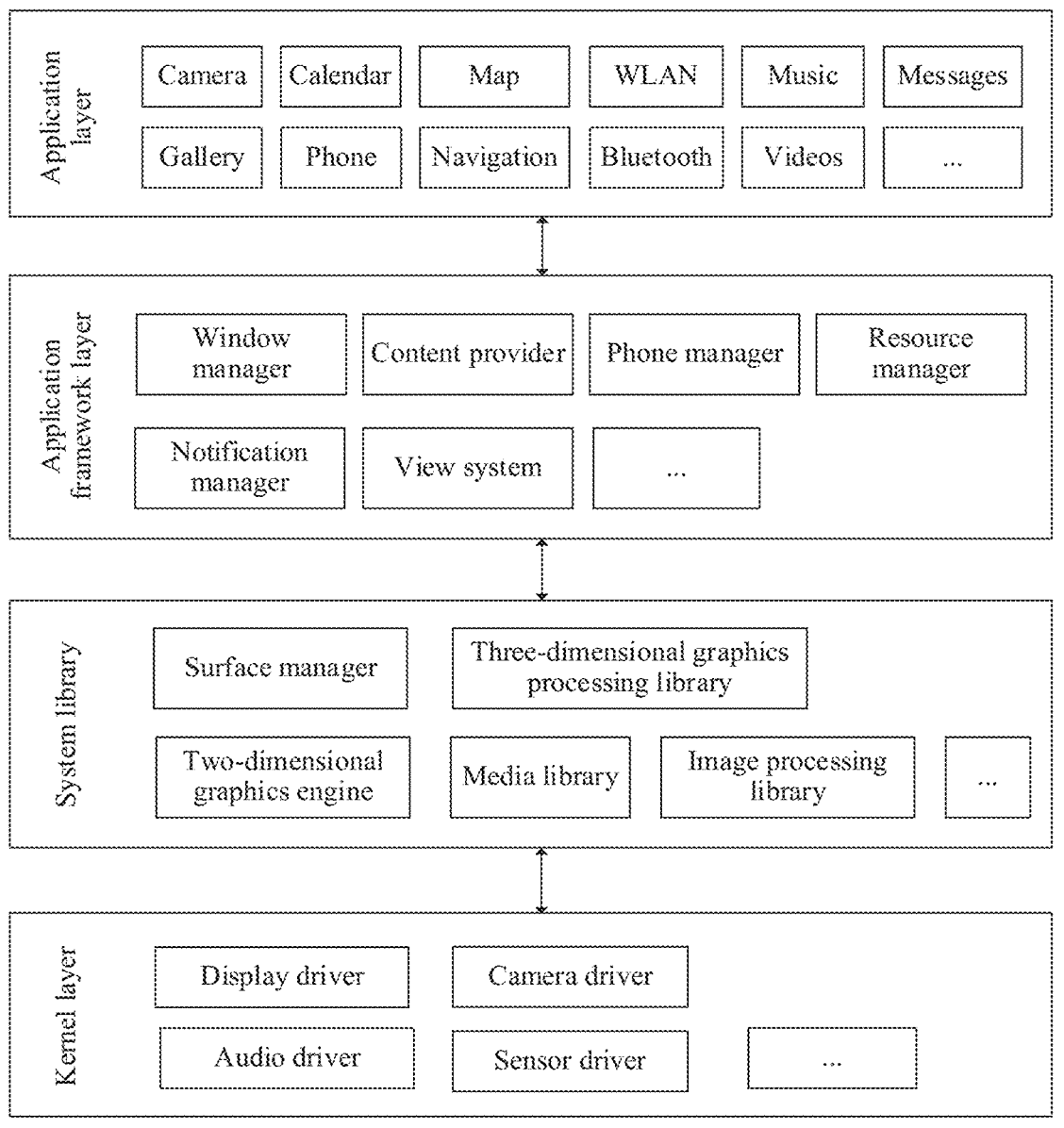
FIG. 2 is a block diagram of a software structure of an electronic device according to an embodiment of this application.

FIG. 2 is a block diagram of a software structure of an electronic device 100 according to an embodiment of this application. In a layered architecture, software is divided into several layers, and each layer has a clear role and task. The layers communicate with each other through a software interface. In some embodiments, an Android system is divided into four layers: an application layer, an application framework layer, an Android runtime (Android runtime) and system library, and a kernel layer from top to bottom. The application layer may include a series of application packages.

As shown in FIG. 2, the application packages may include applications such as Camera, Gallery, Calendar, Phone, Map, Navigation, WLAN, Bluetooth, Music. Videos, and Messages.

The application framework layer provides an application programming interface (application programming interface, API) and a programming framework for an application at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

The content provider is configured to: store and obtain data, and enable the data to be accessed by an application. The data may include a video, an image, an audio, calls that are made and answered, a browsing history and bookmarks, an address book, and the like.

The view system includes visual controls such as a control for displaying a text and a control for displaying an image. The view system may be configured to construct an application. A display interface may include one or more views. For example, a display interface including an SMS message notification icon may include a text display view and an image display view.

The phone manager is configured to provide a communication function for the electronic device 100, for example, management of call statuses (including answering, declining, and the like).

The resource manager provides various resources such as a localized character string, an icon, an image, a layout file, and a video file for an application.

The notification manager enables an application to display notification information in a status bar, and may be configured to convey a notification message. The notification manager may automatically disappear after a short pause without requiring a user interaction. For example, the notification manager is configured to notify download completion, give a message notification, and the like. The notification manager may be alternatively a notification that appears in a top status bar of the system in a form of a graph or a scroll bar text, for example, a notification of an application that is run on a background, or may be a notification that appears on the screen in a form of a dialog window. For example, text information is displayed in the status bar, an announcement is given, the electronic device vibrates, or the indicator light blinks.

The Android runtime includes a kernel library and a virtual machine. The Android runtime is responsible for scheduling and managing the Android system.

The kernel library includes two parts: a function that needs to be invoked in java language, and a kernel library of Android.

The application layer and the application framework layer run on the virtual machine. The virtual machine executes java files of the application layer and the application framework layer as binary files. The virtual machine is configured to implement functions such as object lifecycle management, stack management, thread management, security and exception management, and garbage collection.

The system library may include a plurality of function modules, for example, a surface manager (surface manager), a media library (media library), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, static image files, and the like. The media library may support a plurality of audio and video coding formats, for example, MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

FIG. 3(*a*) to FIG. 3(*c*) show a group of graphical user interfaces (graphical user interfaces, GUIs) according to an embodiment of this application.

As shown in FIG. 3(*a*), when a user wants to watch a paid movie or TV series, a smart TV prompts the user with "Purchase to watch a full version". In this case, a mobile phone within a preset distance from the smart TV may display an icon 301 in a screen-off state. After the mobile phone detects an operation of tapping the icon 301 by the user, the mobile phone may display payment information on the smart TV. The payment information includes a commodity name "Super Movie and TV VIP Monthly Package" and a payment amount "CNY20". The mobile phone may further provide a plurality of payment methods for the user. As shown in FIG. 3(*a*), the payment methods include "Huawei Pay", "Alipay Pay", and "WeChat Pay". After the mobile phone detects that the user uses any payment method to perform payment, the paid movie or the paid TV series may be played on the smart. TV.

In an embodiment, after the mobile phone detects the operation of tapping the icon 301 by the user, the mobile phone may enable a camera to perform facial recognition, or the mobile phone may first perform fingerprint recognition on the user. If the facial recognition performed by the mobile phone on the user succeeds or the fingerprint recognition performed by the mobile phone on the user succeeds, the mobile phone may display the payment information on the smart TV.

In a GUI shown in FIG. 3(*b*), after the smart TV prompts the user with the "Purchase to watch a full version", in this case, when the mobile phone within the preset distance from the smart TV is in a screen-unlocked state, a desktop of the mobile phone may automatically display the icon 301. After detecting the operation of tapping the icon 301 by the user, the mobile phone may display a payment screen shown on the right.

As shown in FIG. 3(*c*), after the smart TV prompts the user with the "Purchase to watch a full version", in this case, when the mobile phone within the preset distance from the smart TV is in the screen-unlocked state, the desktop of the mobile phone may automatically display the icon 301. However, after the mobile phone does not detect the operation of tapping the icon 301 by the user after preset duration ends, the icon 301 may automatically disappear.

It should be understood that a user ID logged in to the smart TV in FIG. 3(*a*) may be a user ID A, and the mobile phone in (a), (b), and (c) may also be a mobile phone to which the user ID A is logged in. Alternatively, the mobile phone in (a), (b), and (c) may also be a mobile phone to Which another user ID is logged in, for example, a user ID B. The user ID B may be in a same family group as the user ID A. Alternatively, the user ID B is a user ID authorized by the user ID A.

Figure 4A:
FIG. 4(a) and FIG. 4(b) show another group of GUIs according to an embodiment of this application.
Figure 4A:
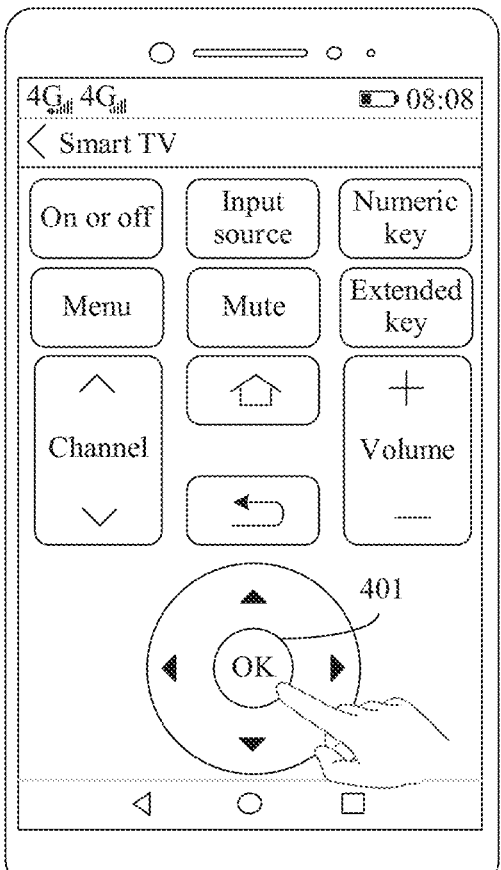

FIG. 4(*a*) and FIG. 4(*b*) show another group of GUIs according to an embodiment of this application.

As shown in FIG. 4(*a*), when a user wants to watch a paid movie, a smart TV prompts the user to select "Purchase to watch", to watch a full movie. In this case, a mobile phone within a preset distance from the smart TV is remotely operating the smart TV After detecting an operation of tapping a control 401 by the user, the mobile phone may display a GUI shown in FIG. 4(*b*).

As shown in FIG. 4(*b*), a payment screen for the paid movie may be directly popped up on the mobile phone. The user can use any payment method of Huawei Pay, Alipay Pay, or WeChat Pay to complete payment, to watch the full movie on the smart TV.

Compared with FIG. 3(*a*), FIG. 3(*b*), or FIG. 3(*c*), the mobile phone in FIG. 4(*a*) is operating the smart. TV Therefore, if the smart TV detects that the user chooses to perform payment by using the mobile phone at this time, the smart TV may directly send payment information to the mobile phone that controls the smart TV The mobile phone may directly display the payment screen, and does not need to pop up a payment reminder icon (for example, the foregoing icon 301).

FIG. 5(*a*) and FIG. 5(*b*) show still another group of GUIs according to an embodiment of this application.

As shown in FIG. 5(*a*), when a user wants to watch a paid movie, a smart TV prompts the user to select "Purchase to watch", to watch a full movie. In this case, there may be a plurality of electronic devices within a preset distance from the smart TV for example, a mobile phone of Lee, a mobile phone of Laura, and a smartwatch of Laura. After detecting that the user taps "Purchase with CNY 5", the smart. TV may display a GUI shown in FIG. 5(*b*).

As shown in FIG. 5(*b*), the smart. TV may prompt the user with "Select a payment method". There are two payment methods: pay by scanning a QR code and pay by using a surrounding device. To pay by using the surrounding device, the smart TV may display information about the surrounding device to the user, for example, "Lee's P30", "Laura's Mate30", and "Laura's HW Watch". After the smart TV detects that the "Laura's Mate30" is tapped, the smart TV may send payment information to a Mate30 of Laura. The user can use the Mate30 of Laura to pay for the Movie.

Figure 6A:
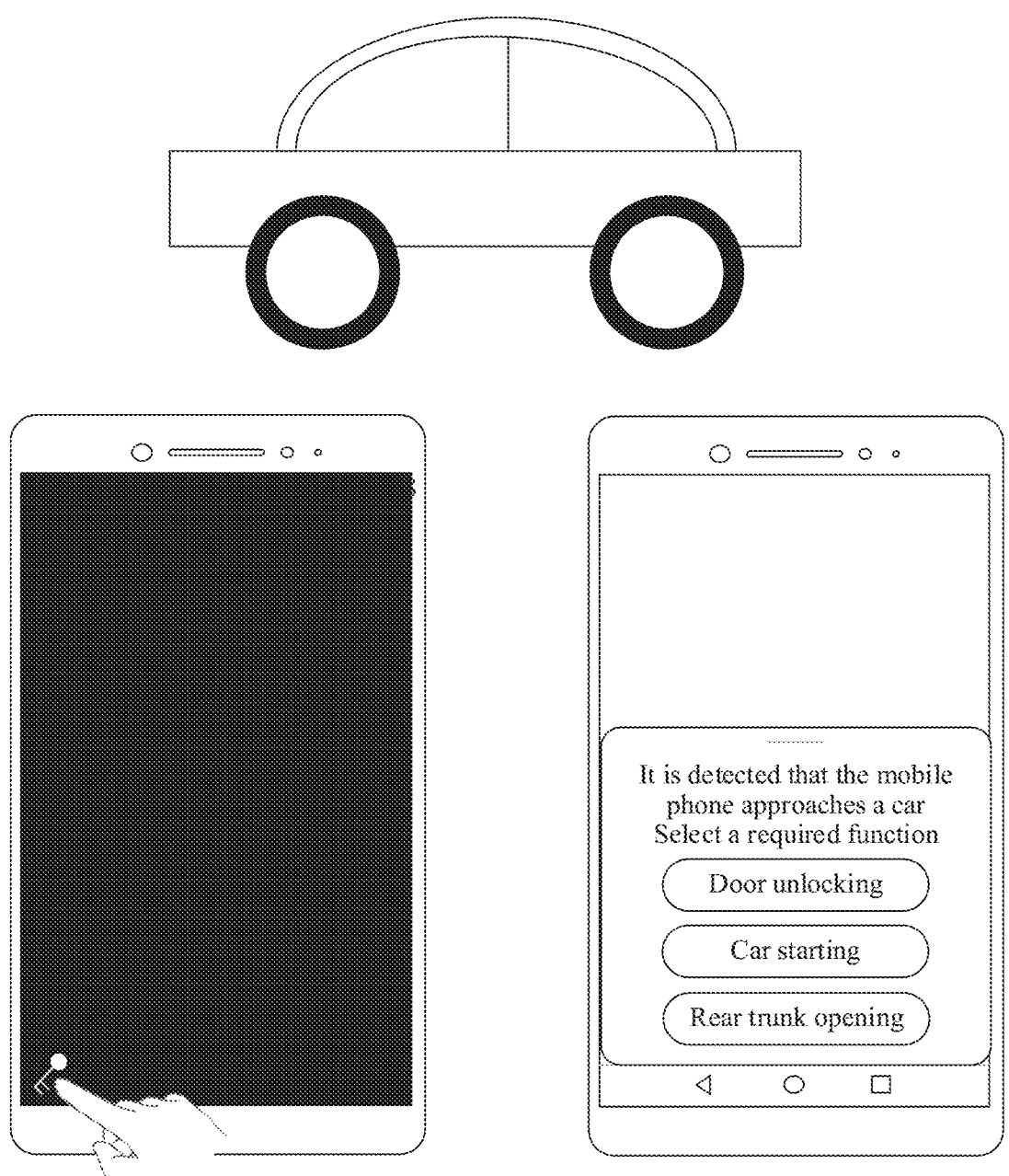
FIG. 6(a) and FIG. 6(b) show yet another group of GUIs according to an embodiment of this application.
Figure 6B:
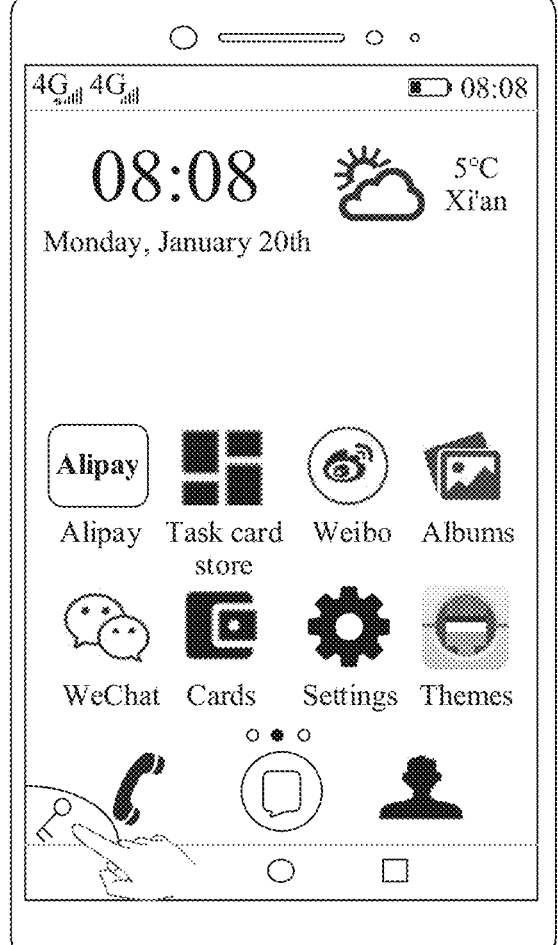
Figure 6B:
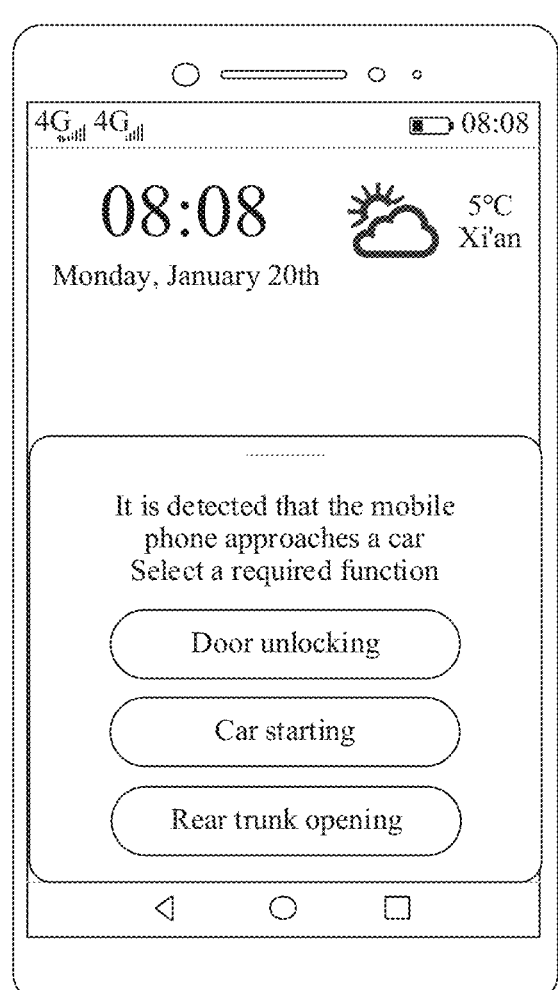

FIG. 6(*a*) and FIG. 6(*b*) show yet another group of GUIs according to an embodiment of this application.

As shown in FIG. 6(*a*), when a user carries a mobile phone to approach a car, the car may send a recommended service to the mobile phone. If the mobile phone is in a screen-off state at this time, the mobile phone may display an icon of a car key on a lower left corner. After the mobile phone detects an operation of tapping the icon of the car key by the user, the mobile phone may prompt, on a display, the user with "It is detected that the mobile phone approaches a car. Select a required function". Functions that can be selected by the user include door unlocking, car starting, rear trunk opening, and the like.

As shown in FIG. 6(*b*), if the mobile phone is in a screen-unlocked state at this time, the mobile phone may display the icon of the car key on the lower left corner. After the mobile phone detects the operation of tapping the icon of the car key by the user, the mobile phone may prompt the user with "It is detected that the mobile phone approaches a car. Select a required function".

In this embodiment of this application, after an electronic device approaches the car, the car may send the recommended service to the mobile phone. In this way, a cumbersome operation that the user searches for the car key and performs a corresponding function by using the car key can be avoided, to improve user experience.

Figure 7A:
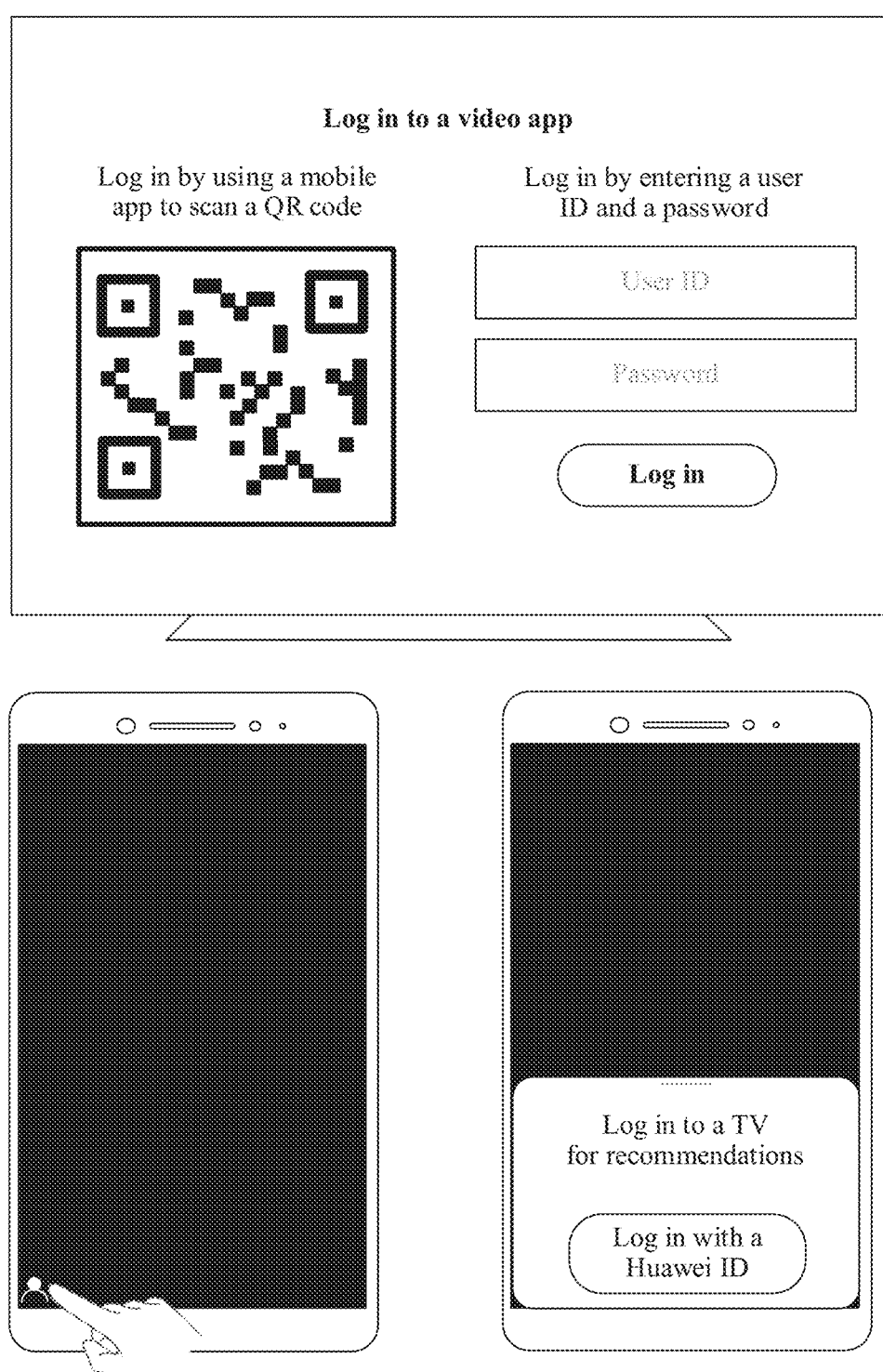
FIG. 7(a) and FIG. 7(b) show still yet another group of GUIs according to an embodiment of this application.
Figure 7B:
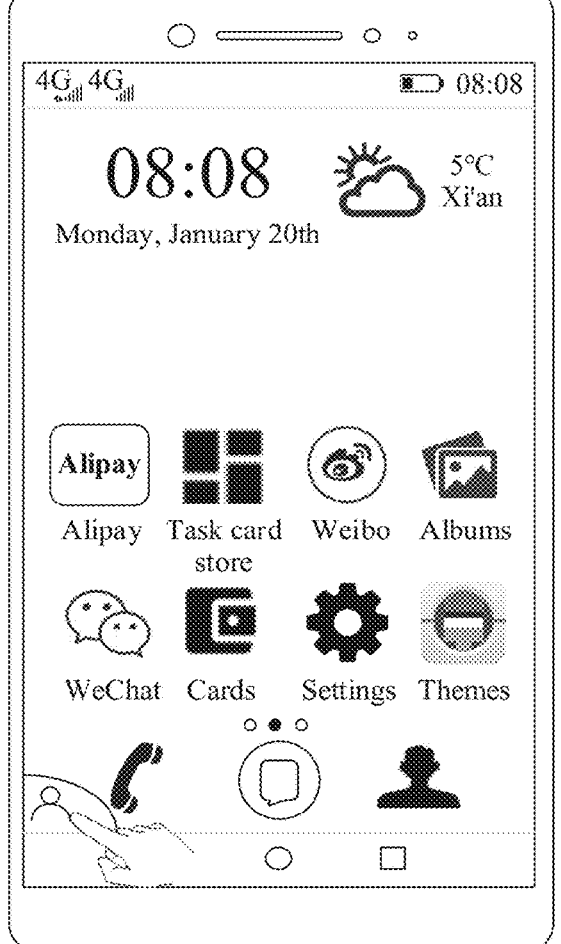
Figure 7B:
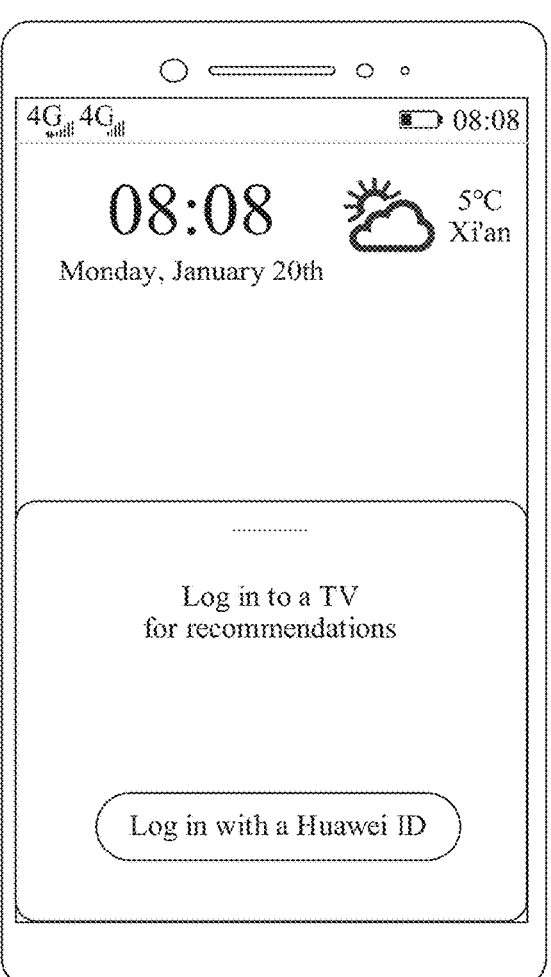

FIG. 7(*a*) and FIG. 7(*b*) show still yet another group of GUIs according to an embodiment of this application.

As shown in FIG. 7(*a*), when a user needs to log in a video application (application, App) to a smart TV, a login screen of the video application may be displayed on the smart TV. There are two ways on the login screen: log in by using a mobile app to scan a QR code and log in by entering a user ID and a password. In this case, if the smart TV detects that there is another mobile phone that is more suitable for login within a preset distance, the smart TV may send a recommended service to the mobile phone. The mobile phone in a screen-off state can automatically pop up a login icon on a lower left corner, After the mobile phone detects an operation of tapping the login icon by the user, the mobile phone may display "Log in to a TV for recommendations." The user can choose to log in with a Huawei ID.

As shown in FIG. 7(*a*), when the mobile phone within the preset distance from the smart TV is in a screen-unlocked state, the mobile phone may display the login icon on the lower left corner of the mobile phone after receiving the recommended service sent by the smart TV. When detecting that the user taps the login icon, the mobile phone may display the login screen on a display.

In an embodiment, the user may authorize the Huawei ID in the video application, or it may be understood that the Huawei ID is bound to a video ID. In this case, if the mobile phone detects that the user taps a control that is used to perform login by using the Huawei ID, the mobile phone may send, by using a cloud server, user ID login information of the video application associated with the Huawei ID to the smart TV, to complete user ID login of the video application on the smart TV.

In another embodiment, if the Huawei ID is not authorized in the video application, the mobile phone may directly prompt the user to log in by using the user ID login information of the video application on the mobile phone.

Figures 8A, 8B:
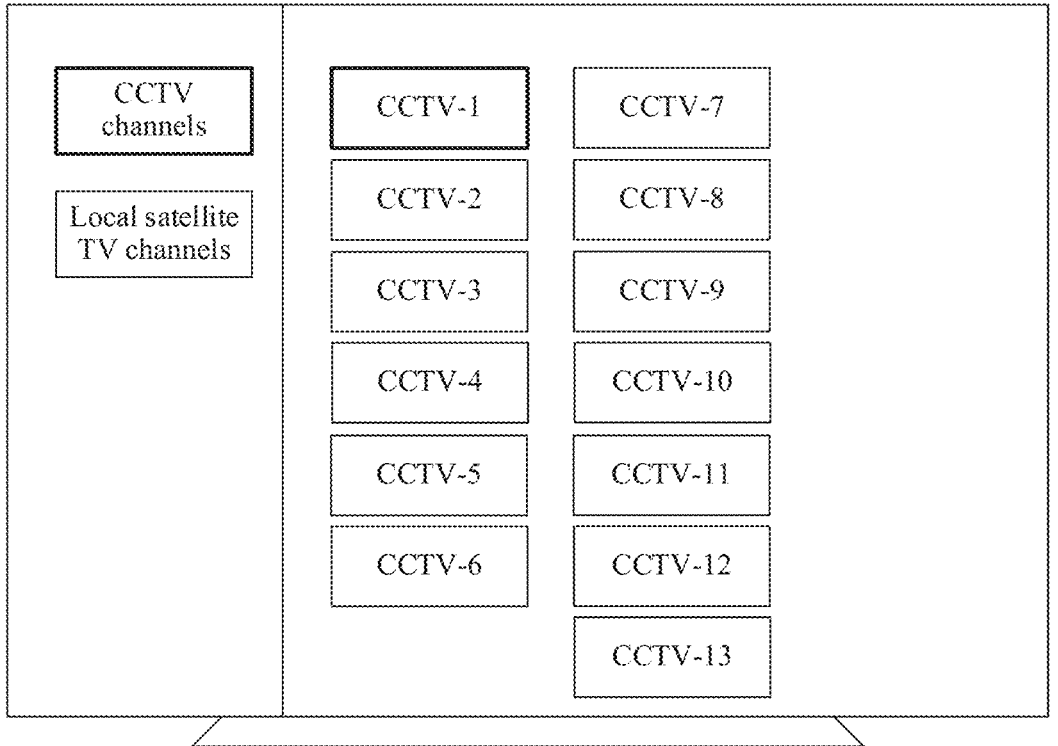
FIG. 8A, FIG. 8B, and FIG. 8C show a further group of GUIs according to an embodiment of this application.
Figures 8A, 8B, 8C:
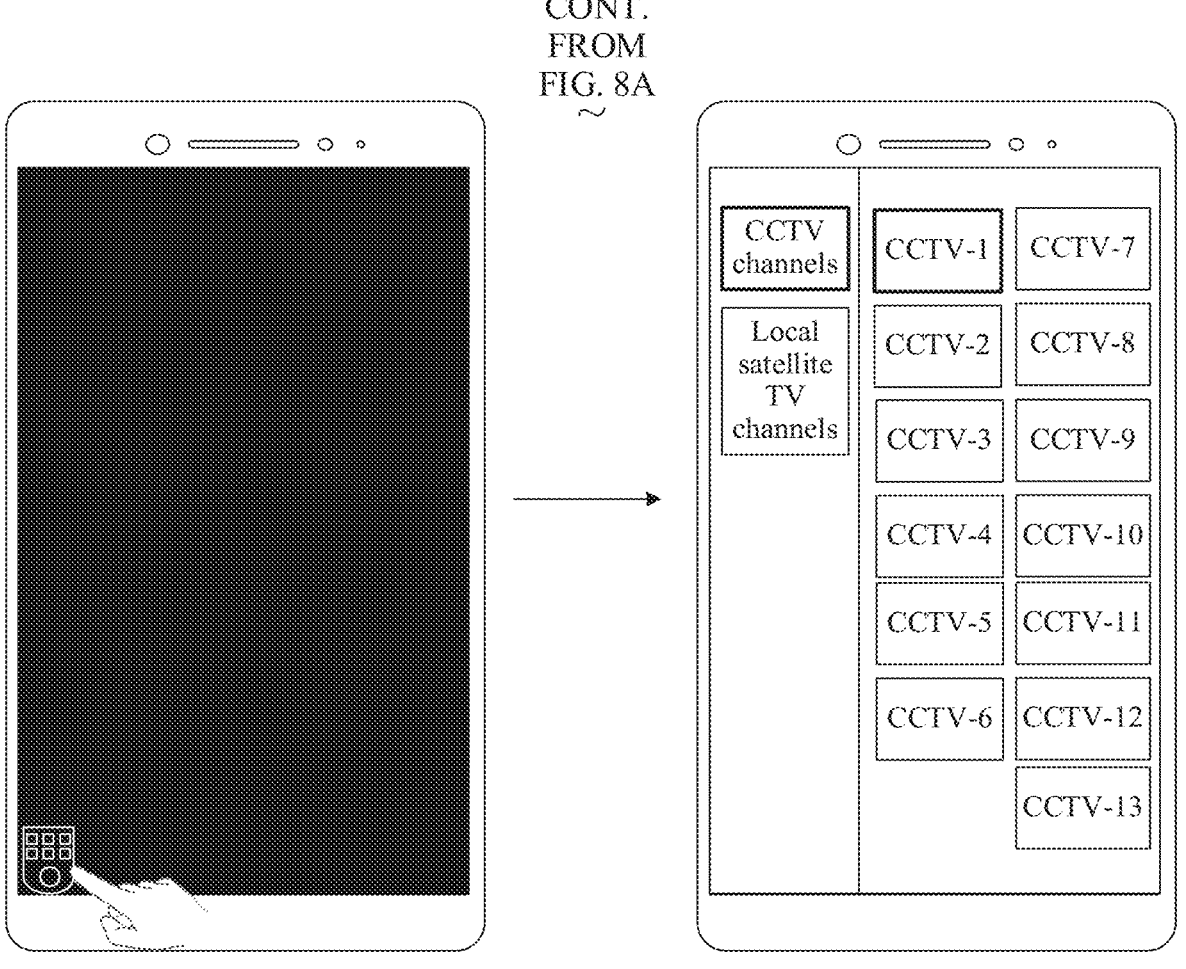
Figures 8B, 8C:
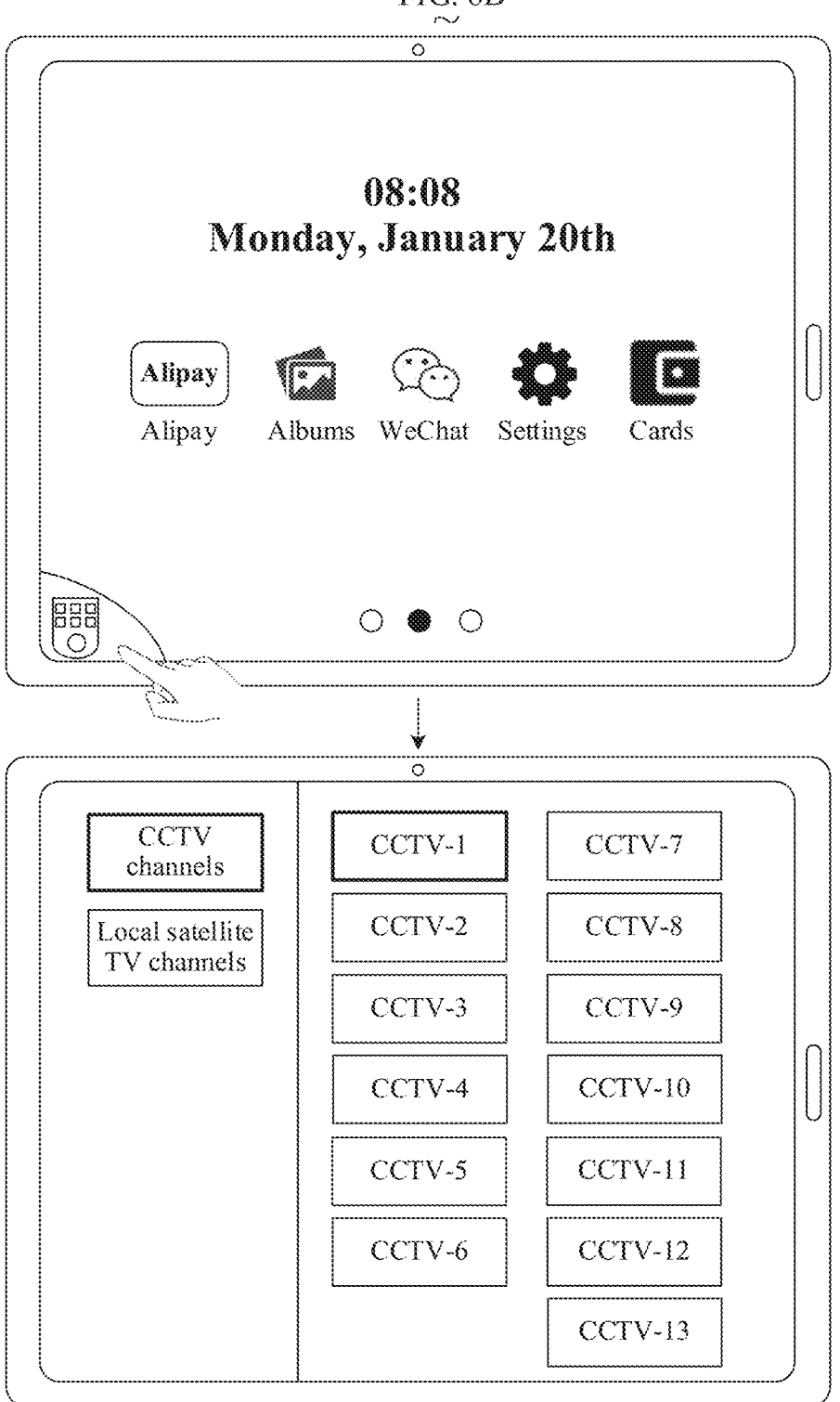

FIG. 8A, FIG. 8B, and FIG. 8C show a further group of GUIs according to an embodiment of this application.

As shown in FIG. 8A. FIG. 8B, and FIG. 8C, when a user Lee is performing a channel switching operation on a smart TV, the smart TV may send a recommended service to another electronic device of Lee within a preset distance. For example, a mobile phone of Lee is in a screen-off state at this time. After the mobile phone receives the recommended service sent by the smart TV, the mobile phone may display a remote control icon on a lower left corner of a screen-off screen. After the mobile phone detects that the user taps the remote control icon, a channel switching interface on the smart TV may be displayed on the mobile phone. In this case, the user can use a remote control to switch a channel on the smart TV.

At the same time, if there is another electronic device, for example, a tablet computer of Laura, within the preset distance from the smart TV, the smart TV may further send the recommended service to the tablet computer, and the tablet computer may pop up a remote control icon on a lower left corner. After detecting an operation of tapping the remote control icon by the user, the tablet computer may display the channel switching interface on the smart TV. The user can use the tablet computer to switch a channel on the smart TV.

In an embodiment, a user ID of Lee and a user ID of Laura are two user IDs in a same family group.

In an embodiment, the user ID of Laura is a user ID authorized by the user ID of Lee.

In this embodiment of this application, in some scenarios such as a channel switching scenario or another function switching scenario of the smart TV, the smart TV may send a service recommendation to a plurality of devices around that meet a condition. In this way, a plurality of users watching TV can simultaneously control the smart TV, and user experience when the users watch the smart TV is improved.

Figures 9A, 9B:
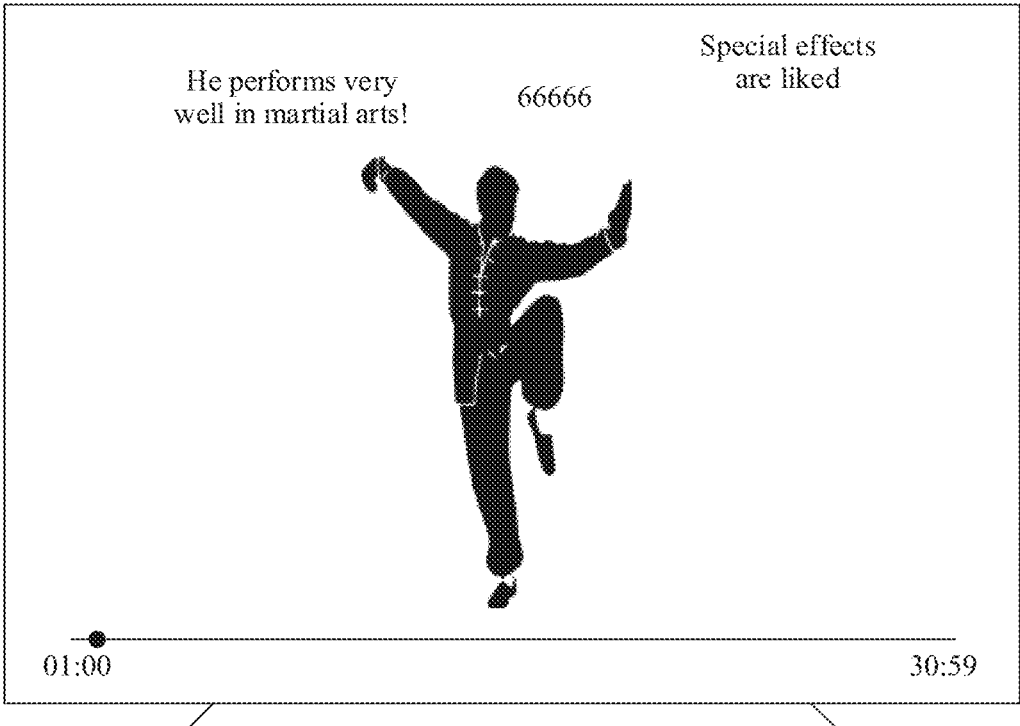
Figures 9A, 9B, 9C:
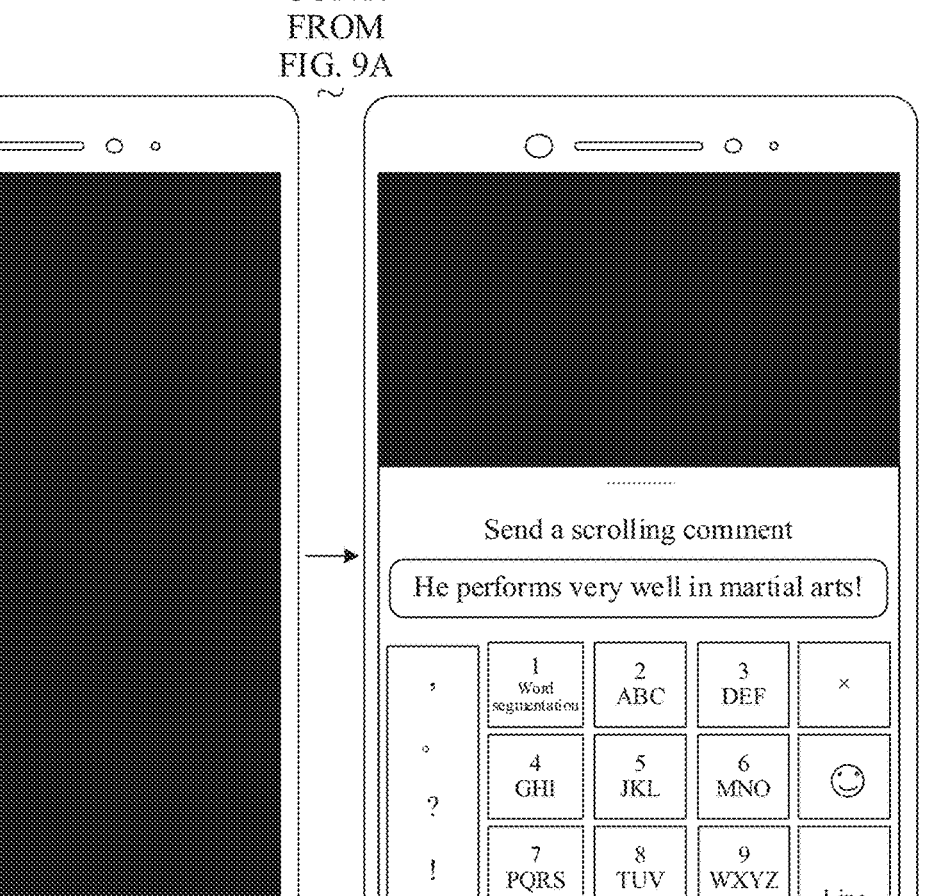
Figures 9B, 9C:
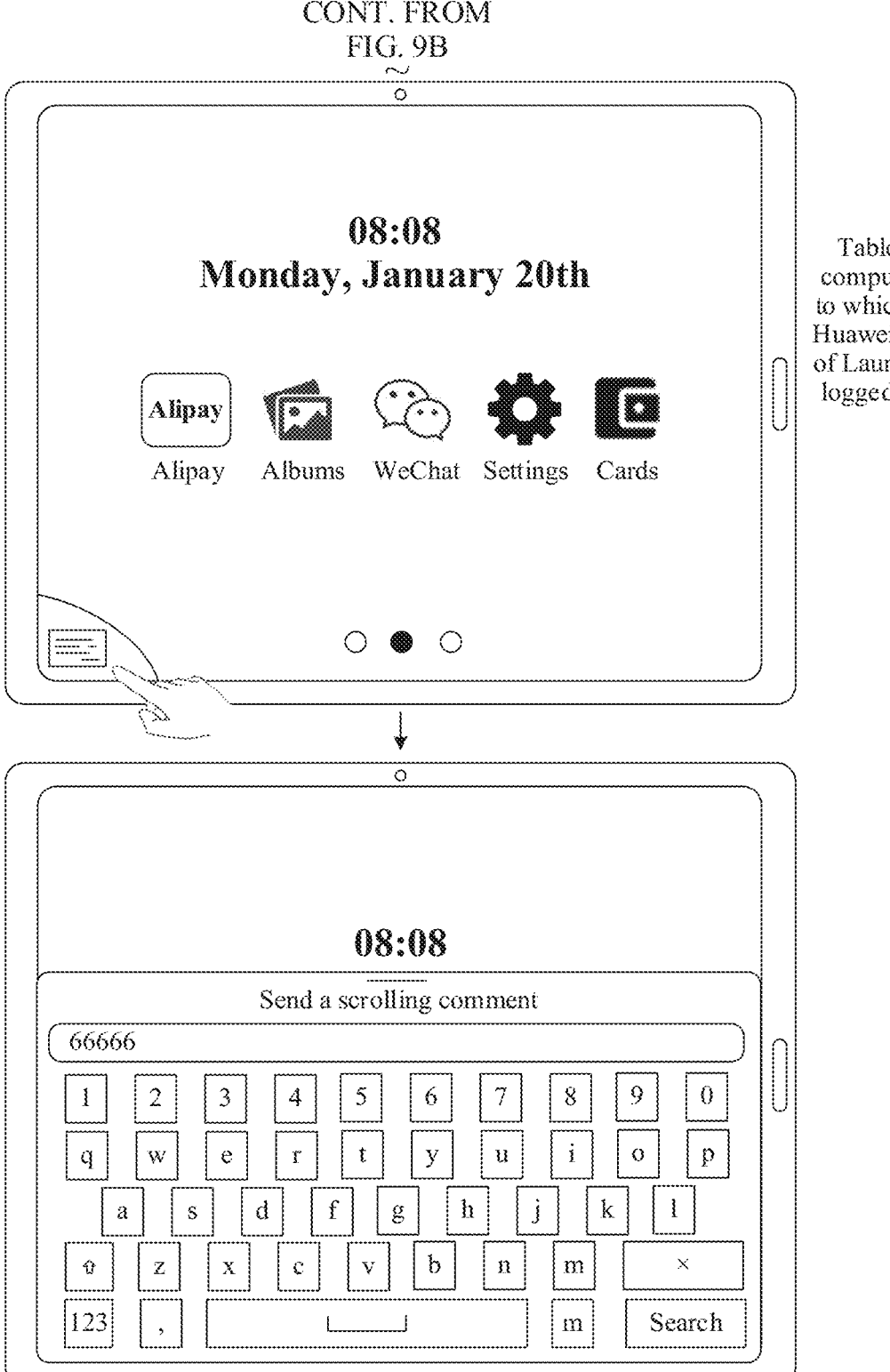

FIG. 9A, FIG. 9B, and FIG. 9C show a still further group of GUIs according to an embodiment of this application.

As shown in FIG. 9A, FIG. 9B, and FIG. 9C, a smart TV (the smart TV is a smart TV to which a user ID of Lee is logged in) is playing a video. The smart TV may send a service recommendation to another electronic device of Lee within a preset distance. For example, a mobile phone of Lee is in a screen-off state at this time. After the mobile phone receives the recommended service sent by the smart TV, the mobile phone may display a scrolling comment sending icon on a lower left corner of a screen-off screen. After detecting that a user taps a scrolling comment sending icon, the mobile phone may display a display interface for editing a scrolling comment. For example, when the mobile phone detects that the user enters "He performs very well in martial arts!", and taps sending, the mobile phone may send information about the scrolling comment to the smart TV. The scrolling comment may be displayed on the smart TV.

At the same time, if there is another electronic device, for example, a tablet computer of Laura, within the preset distance from the smart TV, the smart TV may further send the recommended service to the tablet computer, and the tablet computer may pop up a scrolling comment sending icon on a lower left corner. After detecting an operation of tapping the scrolling comment sending icon by the user, the tablet computer may display a display interface for editing a scrolling comment. For example, after the tablet computer detects an operation of entering "66666" and tapping sending by the user, the mobile phone may send information about the scrolling comment to the smart. TV. The scrolling comment may be displayed on the smart TV.

In this embodiment of this application, in some scenarios such as a scrolling comment sending scenario, the smart TV may send a service recommendation to a plurality of devices around that meet a condition. In this way, a plurality of users watching TV may simultaneously send a scrolling comment, and user experience when the users watch the smart TV is improved.

In an embodiment, the smart TV may further send information about other recommended services to the mobile phone of Lee and the tablet computer of Laura. These recommended services may include a recommended service corresponding to remote control controlling and a recommended service for scrolling comment sending. After detecting that the user taps a corresponding icon, the mobile phone of Lee may display options of a plurality of functions, for example, remote control controlling and scrolling comment sending. When detecting that the user selects one of the functions, the mobile phone of Lee may display a corresponding display interface.

Figure 10A:
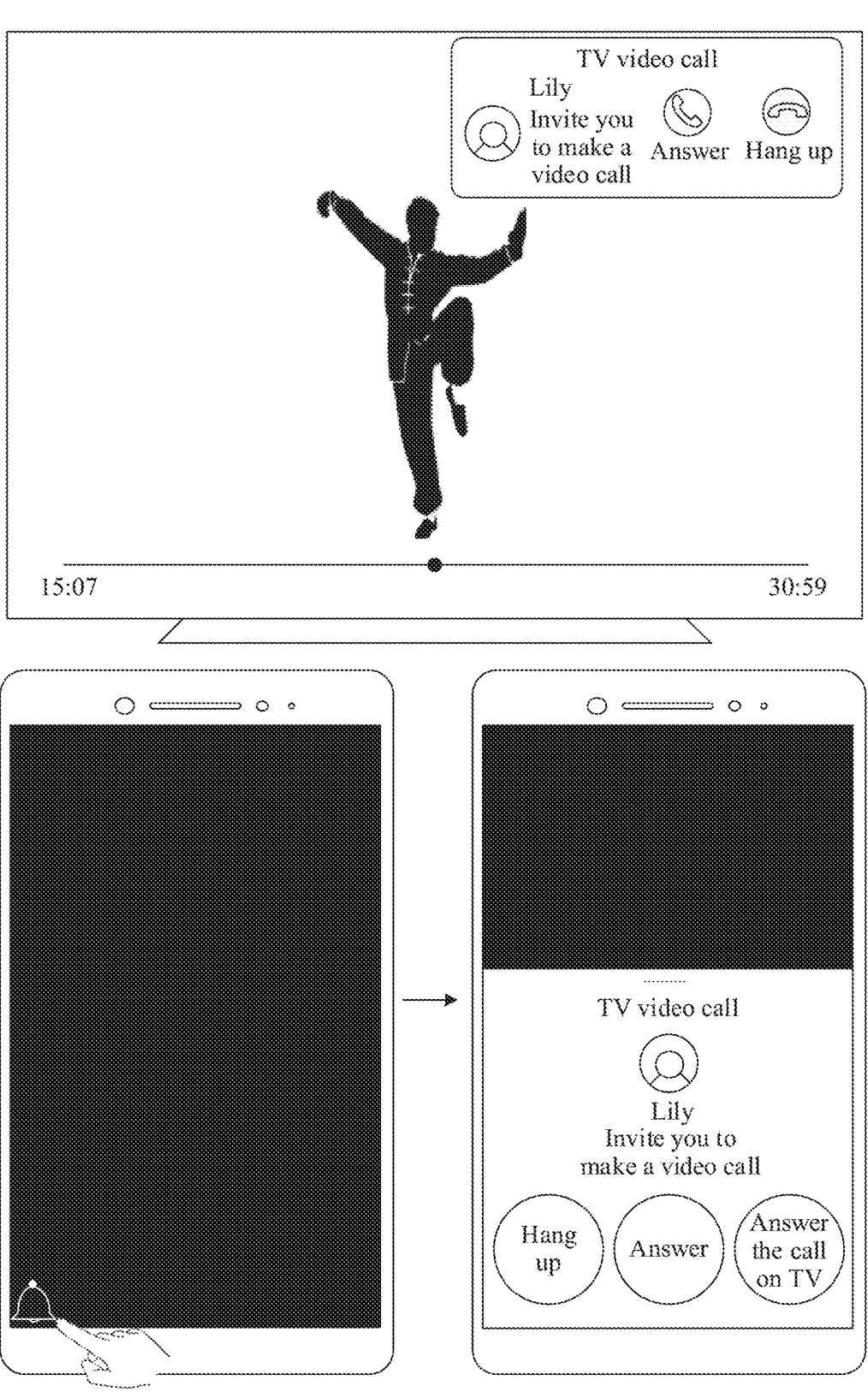
FIG. 10(a) and FIG. 10(b) show a yet further group of GUIs according to an embodiment of this application.
Figure 10B:
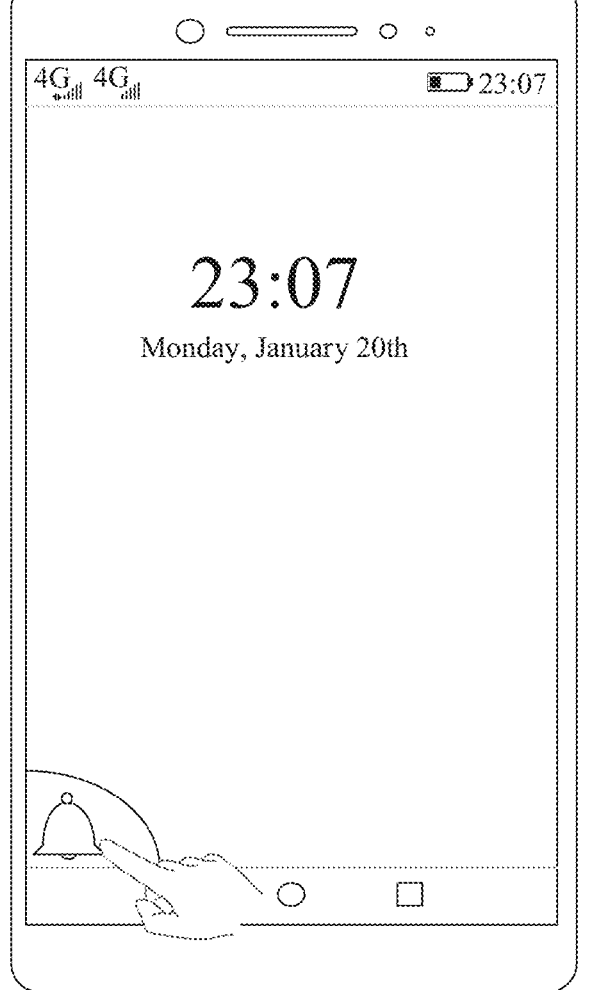
Figure 10B:
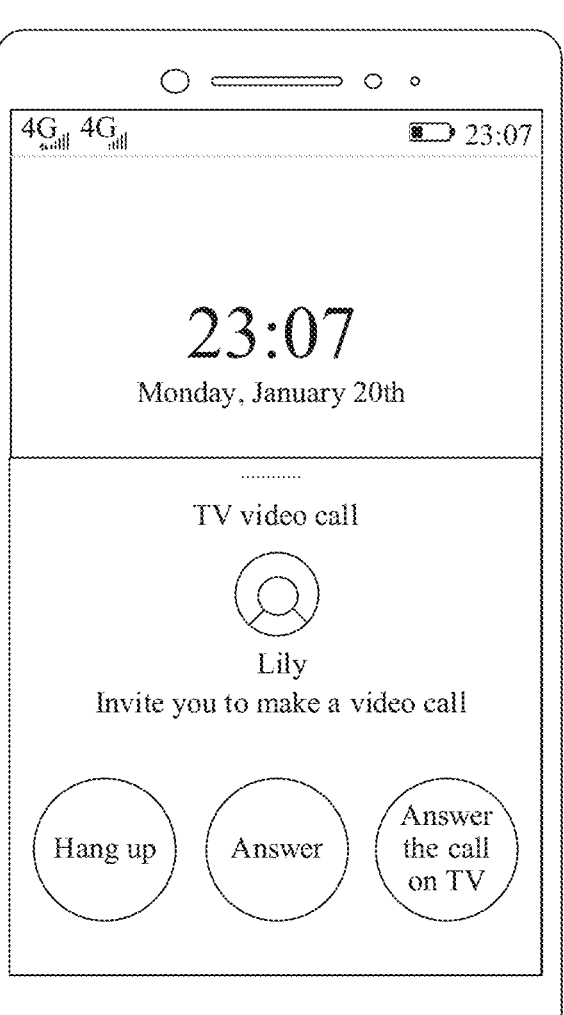

FIG. 10(a) and FIG. 10(b) show a yet further group of GUIs according to an embodiment of this application.

As shown in FIG. 10(a), when a smart TV (the smart TV is a smart TV to which a user ID of Lee is logged in) is playing a video, a user Lily initiates a TV video call. The smart TV may send a service recommendation for the TV video call to an electronic device within a preset distance. For example, a mobile phone within the preset distance is in a screen-off state at this time. After the mobile phone receives the recommended service sent by the smart TV the mobile phone may display a sending reminder icon on a lower left corner of the screen-off screen. After detecting that the user taps the reminder icon, the mobile phone may display a display interface for the TV video call. For example, the user may hang up or answer the TV video call by using the mobile phone. Alternatively, the user may also use the mobile phone to select the TV to answer the video call. In this case, the user may perform a video call with the user Lily by using the smart TV.

As shown in FIG. 10(b), if the mobile phone of the user is in a screen-locked and screen-on state, after receiving the recommended service sent by the smart TV, the mobile phone may pop up the reminder icon on a lower left corner of a display. After the mobile phone detects that the user taps the reminder icon, the mobile phone may display the display interface for the TV video call.

In this embodiment of this application, if the electronic device needs to execute another task when executing a task, to avoid affecting the task that is being executed, the electronic device may push a new task to another electronic device for execution. In this way, simultaneous execution of a plurality of tasks may not be affected, to help improve user experience.

Figure 11:
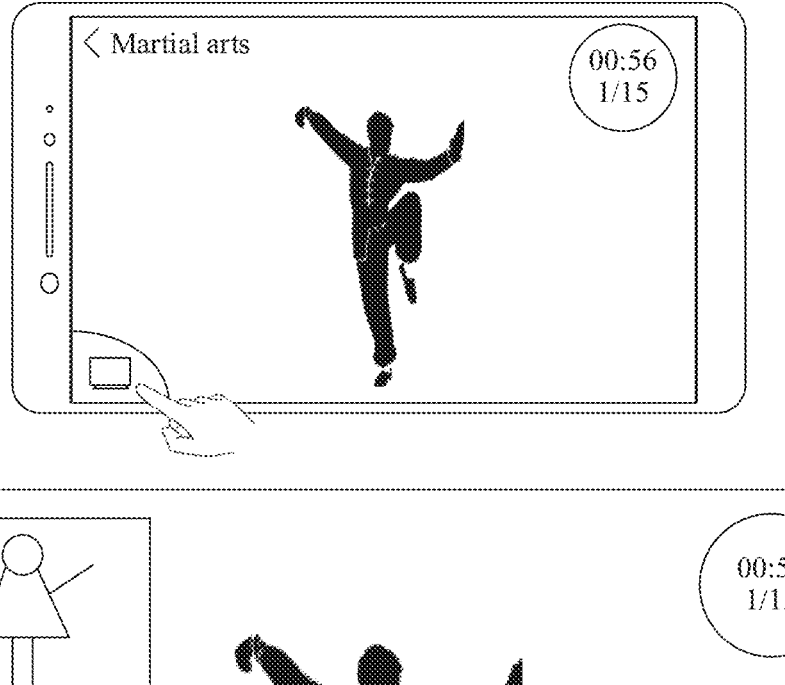
FIG. 11 shows a still yet further group of GUIs according to an embodiment of this application.

FIG. 11 shows a still yet further group of GUIs according to an embodiment of this application.

As shown in FIG. 11, a user is viewing a martial arts video by using a mobile phone. In this case, a big-screen push reminder icon may be automatically popped up on a lower left corner of a video viewing page. After the mobile phone detects that the user taps the big-screen push reminder icon, the mobile phone may send a recommended service to a smart big-screen device (for example, a smart TV) within a preset distance. The martial arts video being played on the mobile phone can be projected to the smart TV.

At the same time, after receiving the recommended service, the smart TV may automatically enable a camera of the smart TV. In this case, when viewing the video by using the smart TV, the user may also observe an exercise picture of the user on an upper left corner of the smart TV.

In an embodiment, in this case, if the smart TV is connected to a smart speaker, when playing the martial arts video, the smart TV may play a sound of the martial arts video by using the smart speaker.

In this embodiment of this application, not only content on the mobile phone is displayed on a big-screen device in a cross-device manner by using the recommended service, but also some value-added capabilities are provided based on physical features of the peer big-screen device, for example, a capability of automatically invoking hardware of the TV such as the camera if video content that needs multi-party interaction or needs to look at oneself or another person, such as yoga, education, or a video call is projected to the TV, and a capability of automatically invoking a far-field sound pickup device that is connected to the TV, for example a speaker, if calling tasks such as the video call and a voice call are displayed on devices such as the big-screen device in a cross-device manner. This helps improve user experience.

Figure 12A:
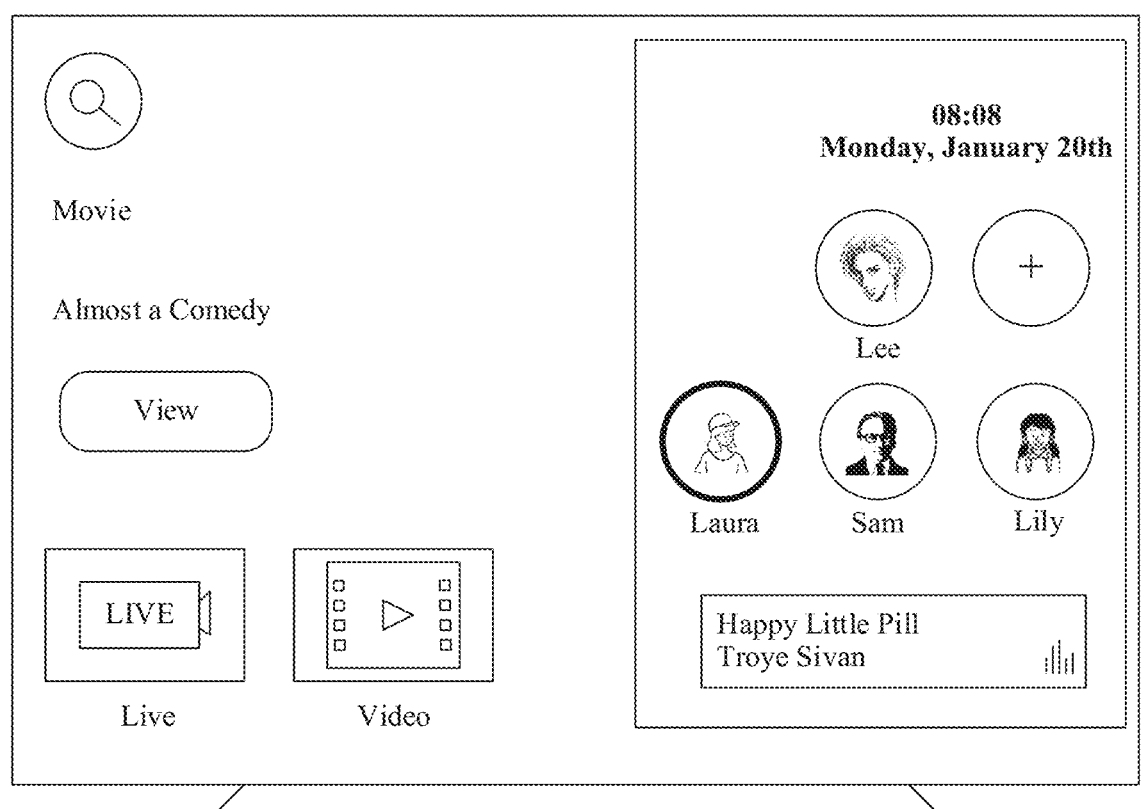
FIG. 12(a) and FIG. 12(b) show even yet another group of GUIs according to an embodiment of this application.
Figure 12B:
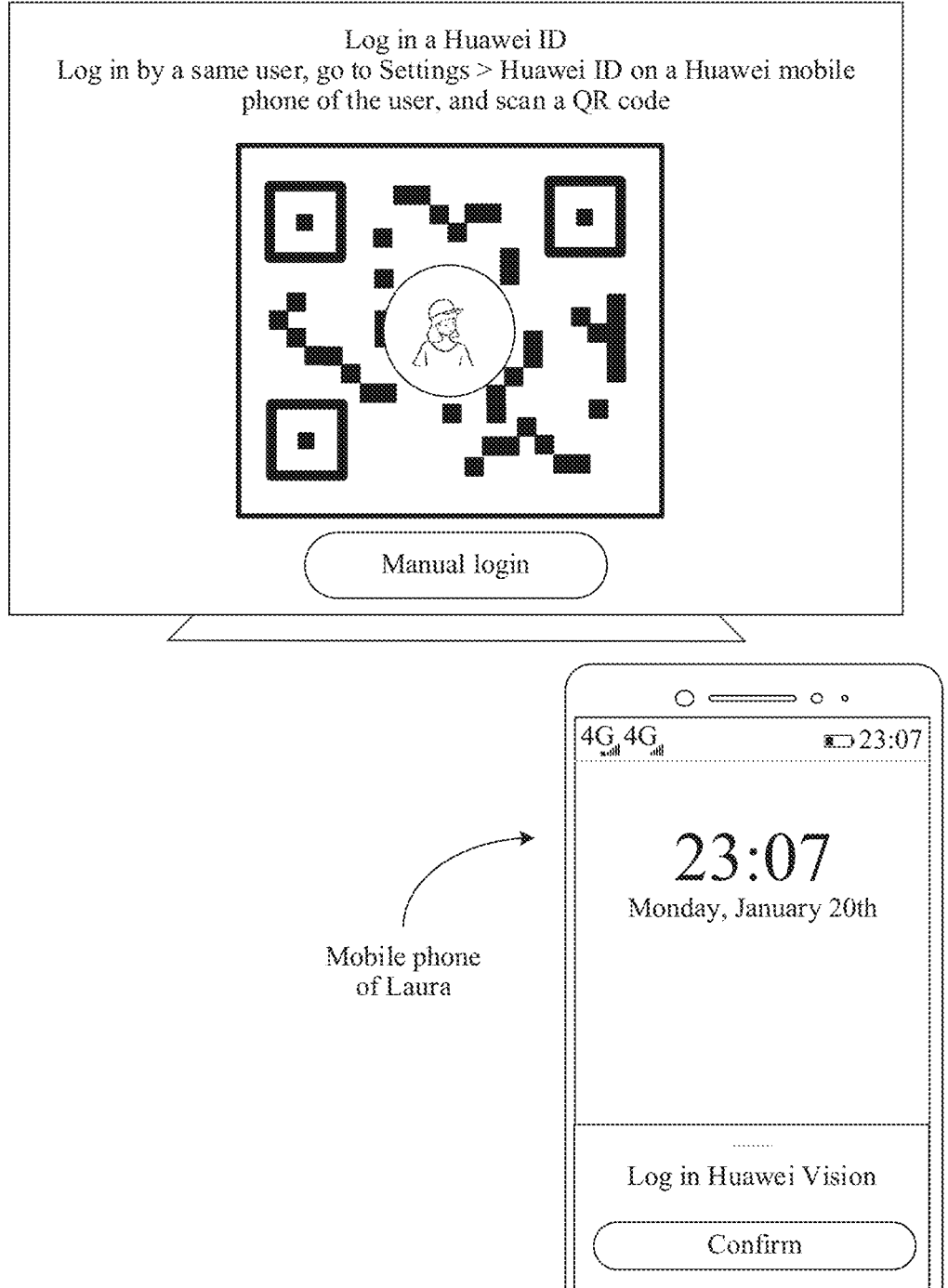

FIG. 12(a) and FIG. 12(b) show even yet another group of GUIs according to an embodiment of this application.

When a user logs in a user ID to a smart TV for the first time, the smart TV may prompt the user to log in by using the user ID and a password or by scanning a QR code. As shown in FIG. 12(a), when a user ID of a user Lee is logged in to the smart TV, the smart TV may further automatically synchronize information about user IDs of family members to be displayed in a user ID list. For example, the smart. TV may display information (for example, information such as a user avatar and a user name) about the family members Laura, Sam, and Lily.

When a user wants to switch the user ID logged in to the smart TV from Lee to Laura, the user can tap a user ID avatar of Laura. In this case, the smart TV needs to perform authentication on the user. For example, the smart TV may enable a camera to collect face information of the user and verify the face information of the user. After face authentication succeeds, the smart TV may display a GUI shown in FIG. 12(b).

As shown in FIG. 12(b), the smart TV may prompt the user to log in by scanning a QR code. In this case, the smart TV may send a recommended service to a mobile phone of a user Laura within a preset distance from the smart TV As shown in FIG. 12(b), the mobile phone of the user Laura may prompt the user with "Log in Huawei Vision". After the mobile phone detects an operation of tapping "Confirm" by the user, the smart TV may complete user ID switching, to switch to the user ID of Laura.

In an embodiment, a login screen in FIG. 12(b) may further include a prompt of user ID and password login. If the user enters a password of the user ID of the user Laura on the smart TV, user ID switching may be completed on the smart TV. Alternatively, the user may scan the QR code on the smart TV by using a mobile phone and then log in the user ID of Laura. Alternatively, switching may be completed by using an SMS message/a security verification code.

Figure 13A:
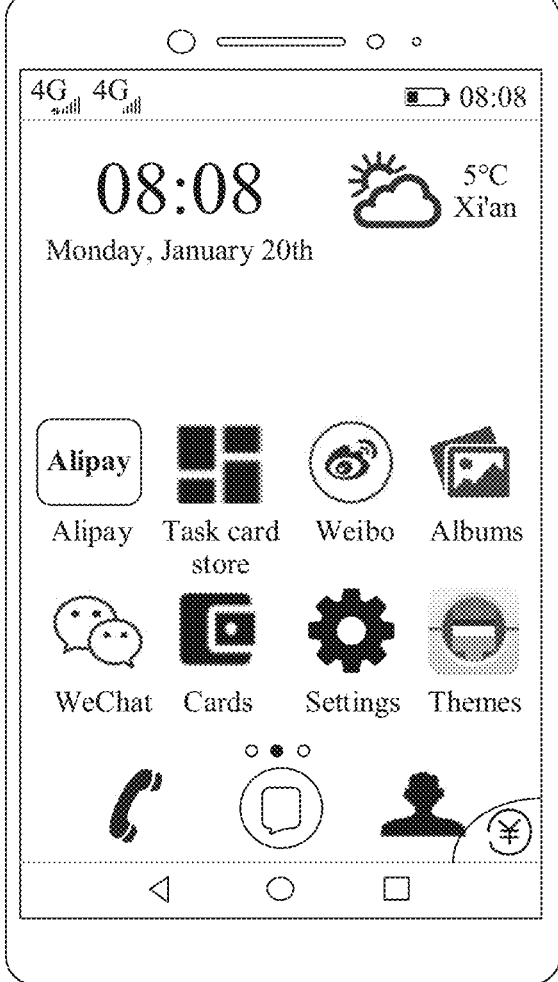
FIG. 13(a) to FIG. 13(c) show an even yet further group of GUIs according to an embodiment of this application.
Figure 13B:
Figure 13C:
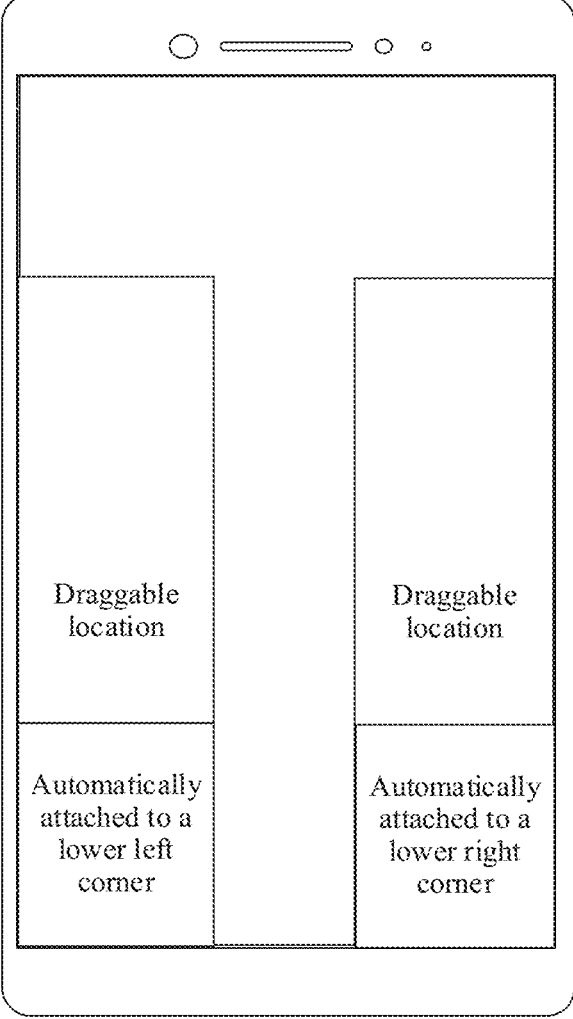

FIG. 13(a) to FIG. 13(c) show an even yet further group of GUIs according to an embodiment of this application.

As shown in FIG. 13(a), after receiving a recommended service sent by another device, the mobile phone may further display a corresponding recommended service icon on a lower right corner.

As shown in FIG. 13(b), the recommended service icon may be further displayed at another location of a lower left corner.

As shown in FIG. 13(c), after the mobile phone receives the recommended service sent by the another device, a user may further drag the icon at a draggable location. After the mobile phone detects that the user drags the icon to another area of the draggable location and releases the icon, the icon may be automatically attached to the lower left corner or the lower right corner.

The foregoing describes several groups of GUIs in embodiments of this application with reference to FIG. 3(a) to FIG. 3(c) to FIG. 13(a) to FIG. 13(c), The following describes a method for recommending a service in a cross-device manner in embodiments of this application with reference to the accompanying drawings.

Figure 14:
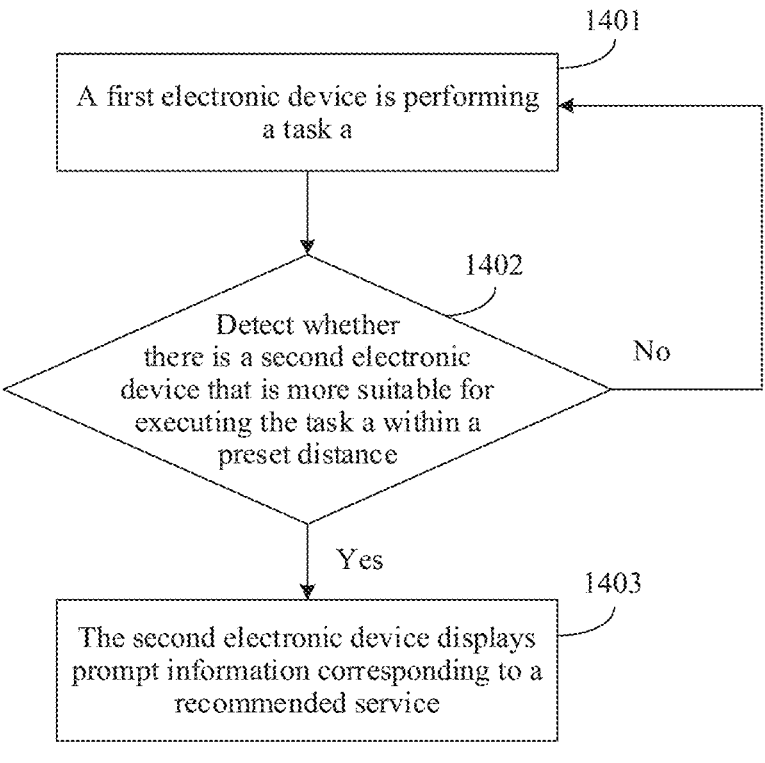
FIG. 14 is a schematic flowchart of a method for recommending a service according to an embodiment of this application.

FIG. 14 is a schematic flowchart of a method 1400 for recommending a service in a cross-device manner according to an embodiment of this application. As shown in FIG. 14, the method includes the following steps.

S1401: A first electronic device is executing a task a.

Figure 3A:
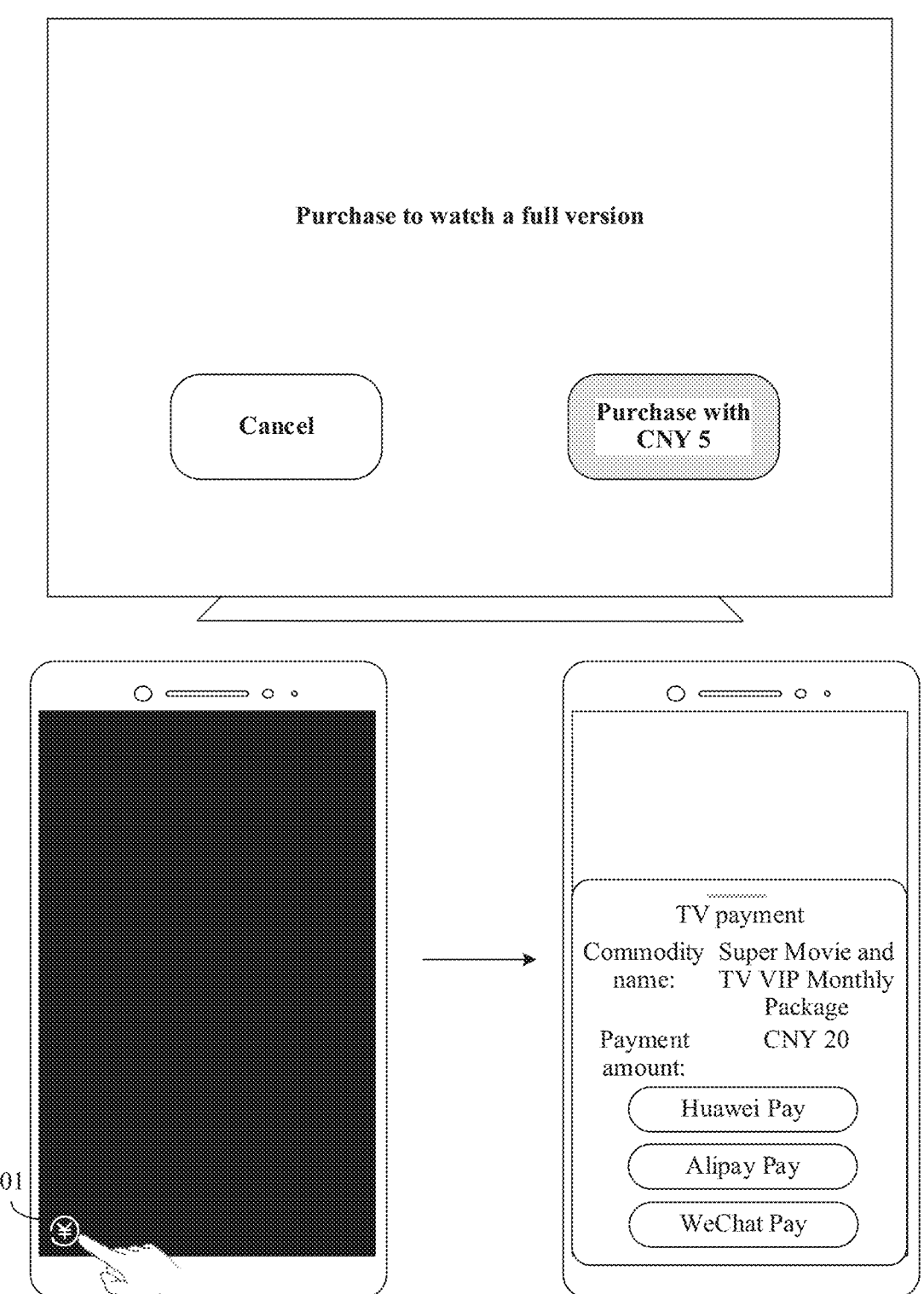
FIG. 3(a) to FIG. 3(c) show a group of GUIs according to an embodiment of this application.

For example, as shown in FIG. 3(a), the first electronic device is the smart TV, and the task a is a TV payment task.

For example, as shown in FIG. 4(a), the first electronic device is the smart TV, and the task a is a TV payment task.

For example, as shown in FIG. 7(a), the first electronic device is the smart TV and the task a is a user ID login task of the video application.

S1402: The first electronic device detects whether there is a second electronic device that is more suitable for executing the task a within a preset distance.

For example, as shown in FIG. 3(a), the smart TV detects that there is the mobile phone that is more suitable for executing the payment task within the preset distance.

Figure 4B:
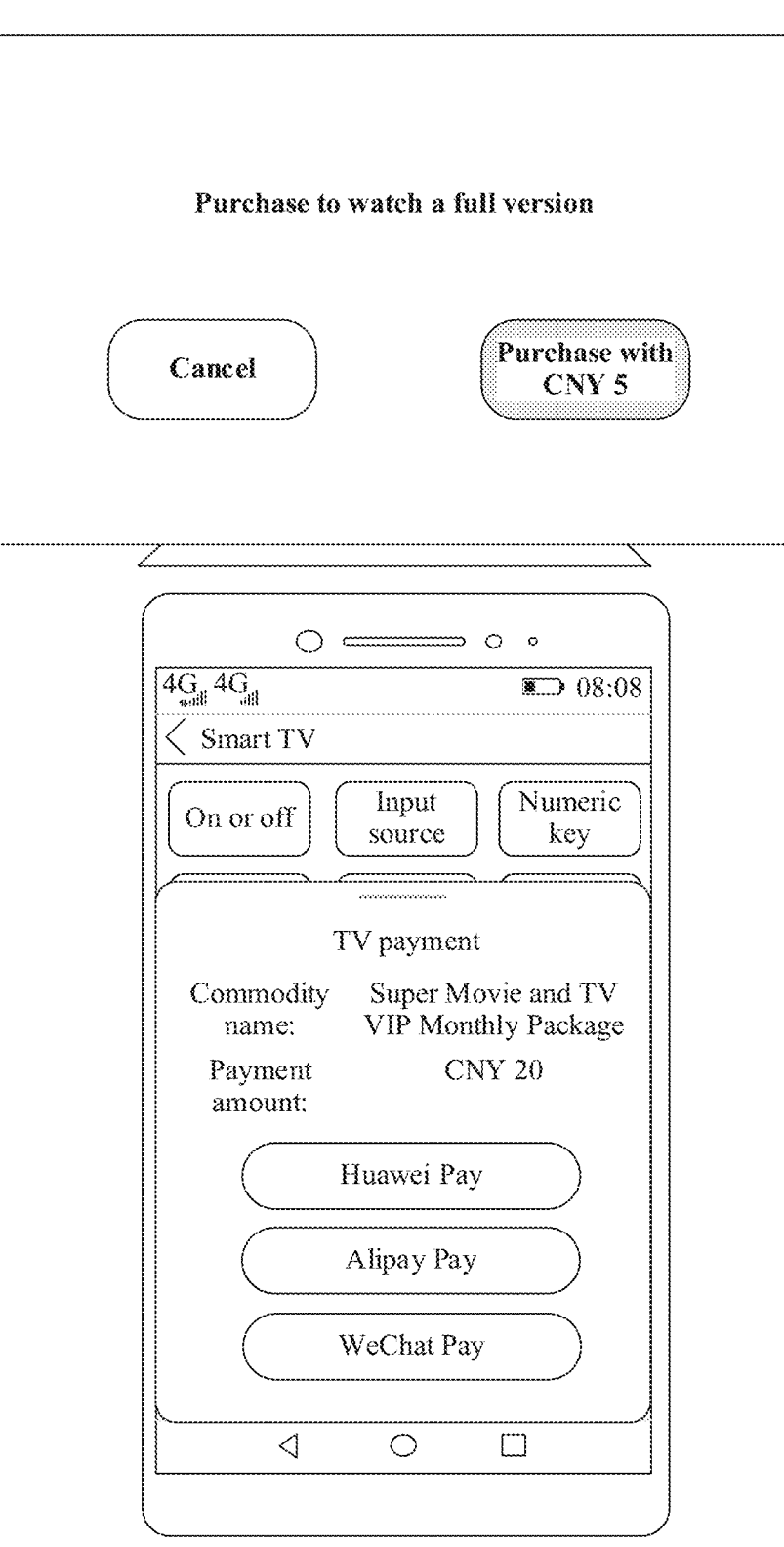

For example, as shown in FIG. 4(b) the smart TV detects that there is the mobile phone that is more suitable for executing the payment task within the preset distance.

For example, as shown in FIG. 7(a), the smart TV detects that there is the mobile phone that is more suitable for executing the user ID login task within the preset distance.

In an embodiment, a correspondence between a device type and a task type that is suitable for being executed may be stored inside an electronic device.

For example. Table 1 shows a correspondence between physical features of a device and a task type that is suitable for being executed.

TABLE 1

| Device type | Physical feature (advantage) | Physical feature (disadvantage) | Suitable task type |
| --- | --- | --- | --- |
| Big-screen device | Large screen, high definition, and good audio quality | Difficulty in touch interaction | Streaming content play, and full image preview |
| Speaker | Good audio quality, far-field sound pickup, and voice interaction | No screen display | audio play |
| Computer | Large screen, suitable for a complex/precise operation | Inconvenient to carry | File processing and official business handling |
| Tablet | Large screen and touchscreen | Inconvenient to carry | Streaming content play/full image preview, payment, login, input, authentication, IoT device enabling and disabling, TV remote control, and notification processing |

TABLE 1-continued

| Device type | Physical feature (advantage) | Physical feature (disadvantage) | Suitable task type |
|---|---|---|---|
| Mobile phone | Carry-on, and convenient interaction | Not too large screen | Payment, login, input, unlocking, authentication, IoT device enabling and disabling, TV remote control, and notification processing |
| Watch | Carry-on | Small screen | Payment, authentication, unlocking, and IoT device enabling and disabling |
| . . . | . . . | . . . | . . . |

For example, when detecting whether there is the second electronic device that is more suitable for executing the task a within the preset distance, the first electronic device first determines whether the task a is suitable for being executed by the first electronic device. As shown in FIG. 3(a), when the smart TV is executing the payment task, the smart TV determines that the task a is not suitable for being executed by the smart TV. In this way, the smart TV searches for whether there is an electronic device that is suitable for executing the task a around the smart TV. First, the first electronic device determines whether there is an electronic device within the preset distance. When the first electronic device determines that there are a plurality of electronic devices within the preset distance, after obtaining device types of the plurality of electronic devices, the first electronic device may determine, based on Table 1, which devices are suitable for executing the task a. For example, if the smart. TV finds that the electronic devices within the preset distance include a mobile phone, a speaker, and a tablet computer, the smart TV determines that the mobile phone and the tablet computer are electronic devices that are suitable for executing the payment task.

It should be understood that Table 1 is merely an example, and this is not limited in this embodiment of this application.

It should be further understood that some devices may be suitable for executing a task of a same type. For example, a mobile phone, a tablet, and a watch are all suitable for performing a payment operation. The electronic device may further store a relationship between priorities of the payment operation. For example, a priority of mobile phone payment is higher than a priority of watch payment, and the priority of the watch payment is higher than a priority of tablet payment. For another example, a big-screen device, a speaker, and a tablet are all suitable for playing the audio, and the electronic device may store a relationship between priorities of audio playing. For example, a priority of playing the audio by the big-screen device is higher than a priority of playing the audio by the computer, and the priority of playing the audio by the computer is higher than a priority of playing the audio by the speaker.

S1403: If the first electronic device detects that there is the second electronic device that is more suitable for executing the task a within the preset distance, the first electronic device sends a corresponding recommended service to the second electronic device, and the second electronic device displays prompt information of the corresponding recommended service.

In this embodiment of this application, recommended services of different types may carry different information.

For example, Table 2 shows a correspondence between a recommended service and carried information.

TABLE 2

| Type of a recommended service | Carried information |
|---|---|
| Payment | Task type of a task a, a commodity name, and a commodity amount |
| User ID login | Task type of a task a, and information about a logged-in application |
| Input | Task type of a task a |
| Remote control controlling | Task type of a task a, and information about a control |
| . . . | . . . |

For example, in a payment scenario, service content carried in the recommended service may be information about the commodity name and information about the commodity amount. In a user ID login scenario, the service content carried in the recommended service may be the information about the logged-in application. In a remote control controlling scenario, the service content carried in the recommended service may be the information about the control (for example, information about a control displayed on the smart TV).

For example, if the task a is a payment task, the recommended service sent by the smart TV to the mobile phone may carry information about the task type (payment task) of the task a, and the information about the commodity name and the information about the commodity amount. In this way, after receiving the corresponding recommended service, the mobile phone may perform corresponding display. A process in which the mobile phone performs display may be the following method 1700.

In an embodiment, if the first electronic device detects that there is the second electronic device that is more suitable for executing the task a within the preset distance, the first electronic device continues to determine whether the second electronic device is a carry-on device. If the second electronic device is the carry-on device, the first electronic device sends the recommended service to the second electronic device, and the second electronic device displays the prompt information corresponding to the recommended service.

Optionally, the carry-on device may be a mobile phone, a smartwatch, or the like.

In an embodiment, if the first electronic device detects that there is no second electronic device that is more suitable for executing the task a within the preset distance, S1401 is performed.

In this embodiment of this application, after the first electronic device detects that there is the second electronic device that is more suitable for executing the task a around, if the second electronic device is more suitable for executing the task a and the second electronic device is the carry-on device, the first electronic device may send the recommended service to the carry-on device. In this way, a user can execute the task a on the carry-on device. In this way, an operation by the user can be facilitated, and user experience is improved.

For example, after determining that the mobile phone and a tablet computer are electronic devices that are suitable for executing the payment task, the smart TV may continue to determine whether the mobile phone and the tablet computer are carry-on devices. Finally, the smart TV may determine the mobile phone as an electronic device to which a service is recommended in a cross-device manner.

If the task a is a task that is not suitable for being executed by a carry-on device, for example, a video playing task or a full image previewing task, the first electronic device may not need to determine whether the task a is the carry-on device, but determine whether the second electronic device is a big-screen device. For example, when the user is browsing a full image by, using the mobile phone, the mobile phone may determine whether there is an electronic device that is more suitable for executing a full image browsing task within a preset distance. If the mobile phone determines that there is a big-screen device (for example, the smart TV) within the preset distance, the mobile phone may send a recommended service to the big-screen device. In this way, the full image can be browsed on the big-screen device.

In an embodiment.

in this embodiment of this application, if an electronic device that is executing a task recognizes that there is an electronic device that is more suitable for executing the task around, or when the two devices approach and recognize an intent of a user, a service is recommended on a proper device, to guide the user to better process the task by using a carry-on/surrounding device. This helps improve the user experience.

Figure 15:
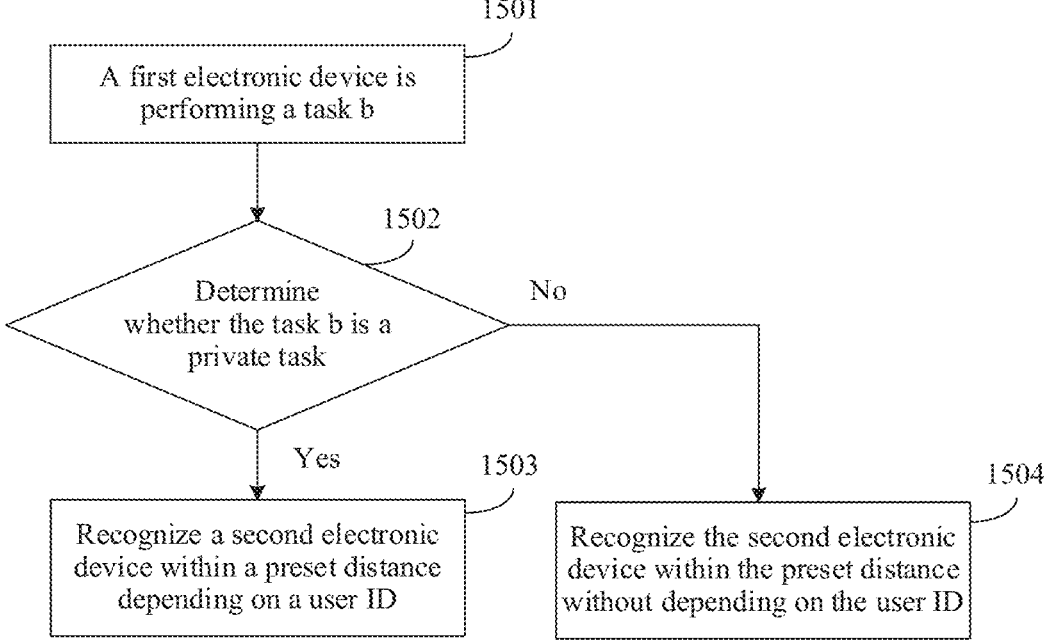
FIG. 15 is a schematic flowchart of a method for recommending a service according to an embodiment of this application.

FIG. 15 is a schematic flowchart of a method 1500 for recommending a service in a cross-device manner according to an embodiment of this application. As shown in FIG. 15, the method 1500 includes the following steps.

S1501: A first electronic device is executing a task b.

For example, as shown in FIG. 3(a), the first electronic device is the smart TV, and the task b is a TV payment task.

For example, as shown in FIG. 4(a), the first electronic device is the smart TV, and the task b is a TV payment task.

S1502: The first electronic device determines whether the task b is a private task.

In an embodiment, an electronic device may store a correspondence between a task type and whether a task is a private task.

For example, Table 3 shows a correspondence between a task type, whether a task is a private task, and whether a surrounding electronic device is selected based on a user ID during cross-device recommendation.

TABLE 3

| Task type | Private task or not | Whether a surrounding electronic device is selected based on a user ID during cross-device recommendation |
|---|---|---|
| Input | The default value is N. You can set it to Y | The default value is N. |
| Payment | Y | Y |
| Log in | N | N |
| Sending | The default value is N. You can set it to Y | The default value is N. |

TABLE 3-continued

| Task type | Private task or not | Whether a surrounding electronic device is selected based on a user ID during cross-device recommendation |
|---|---|---|
| Unlocking | Y | Y |
| Authentication | Y | Y |
| IoT device enabling and disabling | N | N |
| Remote control controlling | N | N |
| Notification processing | Y | Y |
| . . . | . . . | . . . |

It should be understood that the private task in this embodiment of this application may be selected by a user. For example, the user may set, on a display interface of the electronic device, tasks corresponding to some applications as private tasks. Alternatively, a type (for example, payment, authentication, or unlocking) of a private task may be preset in the electronic device before delivery.

For example, as shown in FIG. 3(a), after detecting an operation of tapping payment by the user, the smart TV may first determine that the payment task is a private task. In addition, the smart TV may further determine that the payment task may be recommended in a cross-device manner by selecting another electronic device around depending on a user ID.

S1503: If the task b is the private task, the first electronic device may recognize a second electronic device within a preset distance depending on the user ID.

Optionally, if the task b is the private task, the first electronic device recognizes the second electronic device based on one or more of the following conditions:

(1) a distance between the second electronic device and the first electronic device is less than or equal to the preset distance;

(2) the second electronic device is a device to which a same user ID is logged in as the first electronic device, or to which a user ID in a same family group is logged in as the first electronic device, or in which an authorized associated user ID is located;

(3) the second electronic device is available and connected to a network; and (4) both the second electronic device and the first electronic device enable Bluetooth, are connected to a same Wi-Fi router, or the like.

For example, when the smart TV is performing a payment operation, the smart TV may first determine, according to Table 3, that the payment operation is an operation of selecting a surrounding electronic device based on a user ID to recommend a service. In this case, the smart TV may preferably determine an electronic device within a preset distance from the smart TV. For example, the smart TV may first determine that a device 1, a device 2, and a device 3 are included within the preset distance.

In this embodiment of this application, a manner in which the first electronic device determines an electronic device within a preset distance is not specifically limited. For example, the first electronic device may determine a distance between a surrounding device and the first electronic device based on signal quality or signal strength of a signal sent by the surrounding device to the first electronic device. Alternatively, the first electronic device may determine the distance between the surrounding device and the first electronic device in an ultrasonic ranging manner. Then, the first electronic device may screen out the electronic device within the preset distance.

After determining a device 1, a device 2, and a device 3 based on the preset distance, the first electronic device may continue to determine association relationships between user IDs logged in to the device 1, the device 2, and the device 3 and a user ID logged in to the first electronic device. If the user ID logged in to the device 1 is the same as the user ID logged in to the first electronic device, the device 1 meets the condition (2). If the user ID logged in to the device 1 and the user ID logged in to the first electronic device are user IDs in a same family group, the device 1 meets the condition (2). If the user ID logged in to the device 1 is a user ID authorized by the user ID logged in to the first electronic device, the device 1 meets the condition (2). If the user IDs logged in to the device 2 and the device 3 are unrelated to the user ID logged in to the first electronic device, the device 2 and the device 3 do not meet the condition (2).

In this embodiment of this application, after the first electronic device determines the device 1, the device 2, and the device 3 within the preset distance, the first electronic device may continue to query the device 1, the device 2, and the device 3 for information about device names and device types of the device 1, the device 2, and the device 3. The first electronic device may be an electronic device to which a first user ID is logged in, and the first electronic device may also store information about another user ID associated with the first user ID. For example, the first electronic device stores information about another user ID in the same family group as the first user ID and device names of electronic devices associated with these user IDs. After obtaining the device names of the device 1, the device 2, and the device 3, the first electronic device may determine whether the device 1, the device 2, and the device 3 are electronic devices which the first user ID or a user ID associated with the first user ID is logged in to. Therefore, the first electronic device may determine, by using the device names, whether the device 1, the device 2, and the device 3 meet the condition (2).

In an embodiment, the first electronic device may continue to determine that the device 1 is available and is connected to a network, and both the device 1 and the first electronic device enable Bluetooth or are connected to a same Wi-Fi router. Finally, the first electronic device may determine the device 1 as an electronic device to which a service can be recommended in a cross-device manner.

It should be understood that, in this embodiment of this application, for the condition (3), if another device around the first electronic device is in a powered-off state or another non-working stale, the first electronic device does not obtain a response from the surrounding device when sending information to the surrounding device. For the condition (4), the first electronic device may send a Bluetooth BLE data packet to the surrounding device, and if obtaining a response from the surrounding device, may determine that the surrounding device also enables Bluetooth. Alternatively, the first electronic device may learn information about another electronic device connected to the Wi-Fi router, and the first electronic device may determine whether the first electronic device and the second electronic device are connected to a same Wi-Fi router.

In an embodiment, for the scenarios shown in FIG. 6(*a*) and FIG. 6(*b*), it may be considered that the car is connected to a pad and the pad is connected to a user ID of the user (for example, a Huawei ID 1). After the car is parked at a location, the mobile phone to which the Huawei ID 1 is logged in may store information about the parking location of the car. The mobile phone may determine a relationship between a current location of the user and the parking location of the car. After the mobile phone of the user approaches the car, the mobile phone may send information to the pad connected to the car. The information may indicate that a distance between the mobile phone of the user and the car is within a preset range. In this case, after receiving the information sent by the mobile phone, the car may send a recommended service to the mobile phone, to display corresponding prompt information on the mobile phone.

It should be understood that the scenarios shown in FIG. 6(*a*) and FIG. 6(*h*) may alternatively be a door lock unlocking scenario or the like.

It should be further understood that an electronic device (for example, a mobile phone to which a Huawei ID 2 is logged in, where the Huawei ID 1 and the Huawei ID 2 are associated IDs in a same family group) of another user in a family group of the user or an electronic device (for example, a mobile phone to which a Huawei ID 3 is logged in, where the Huawei ID 3 is authorized by the Huawei ID 1) to which a user ID authorized by the Huawei ID 1 is logged in may store the information about the parking location of the car. In this case, when the electronic devices to which an associated Huawei ID is logged in approach the car, recommendation of a service may be completed based on the foregoing implementation process.

S1504: if the task b is not the private task, the first electronic device may recognize the second electronic device within the preset distance without depending on the user ID.

Optionally, if the task h is not the private task, the first electronic device recognizes the second electronic device based on one or more of the following conditions:

(1) a distance between the second electronic device and the first electronic device is less than or equal to the preset distance;

(2) the second electronic device is available and connected to a network; and (3) both the second electronic device and the first electronic device enable Bluetooth, are connected to a same router, or the like.

For example, as shown in FIG. 8A, FIG. 8B, and FIG. 8C, when the user operates the smart TV to perform a channel switching operation, the smart TV may first determine, according to Table 2, that a remote control operation is not an operation of selecting a surrounding electronic device based on a user ID to recommend a service. In this case, the smart TV may preferably determine an electronic device within a preset distance from the smart TV. For example, the smart TV may first determine that a device 1, a device 2, and a device 3 are included within the preset distance.

After determining a device 1, a device 2, and a device 3 based on the preset distance, the first electronic device only needs to continue to determine whether the device 1, the device 2, and the device 3 are available and connected to a network, and whether the device 1, the device 2, the device 3, and the first electronic device all enable Bluetooth or are connected to a same Wi-Fi router. Therefore, it is finally determined that the device 1 (for example, a mobile phone to which a Huawei ID of Lee is logged in) and the device 2 (for example, a tablet computer to which a Huawei ID of Laura is logged in) are devices to which the recommended service can be sent.

S1505: The first electronic device initiates a service recommendation to the second electronic device.

In this embodiment of this application, if an electronic device that is executing a private task recognizes that there is an electronic device around that is more suitable for executing the task and user IDs logged in to the two electronic devices are associated, a service is recommended on a proper device, to guide a user to better process the task by using a carry-on/surrounding device. This helps improve user experience, and also helps protect privacy security of the user.

Figure 16A:
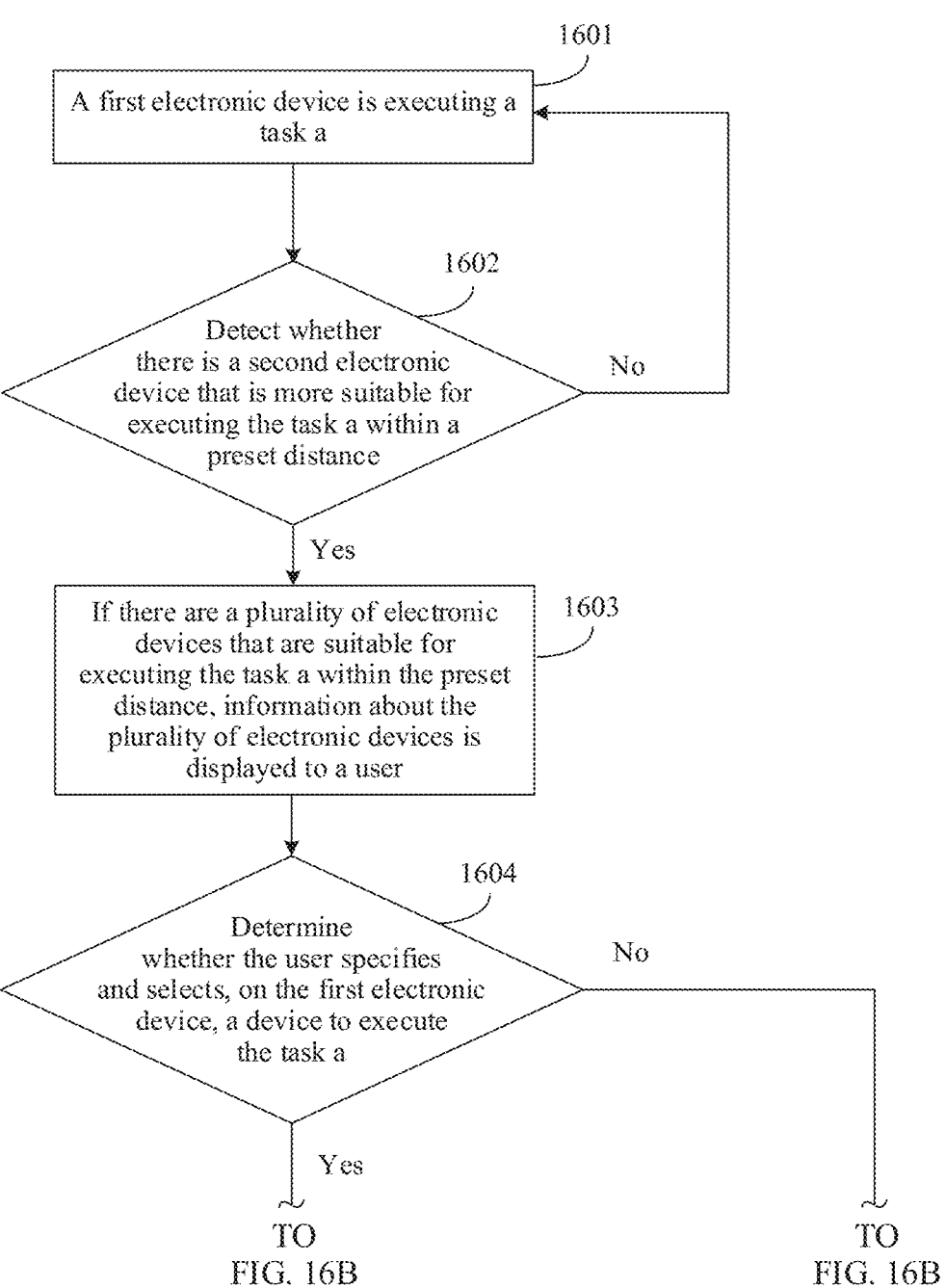
FIG. 16A and FIG. 16B are a schematic flowchart of a method for recommending a service according to an embodiment of this application.
Figure 16B:
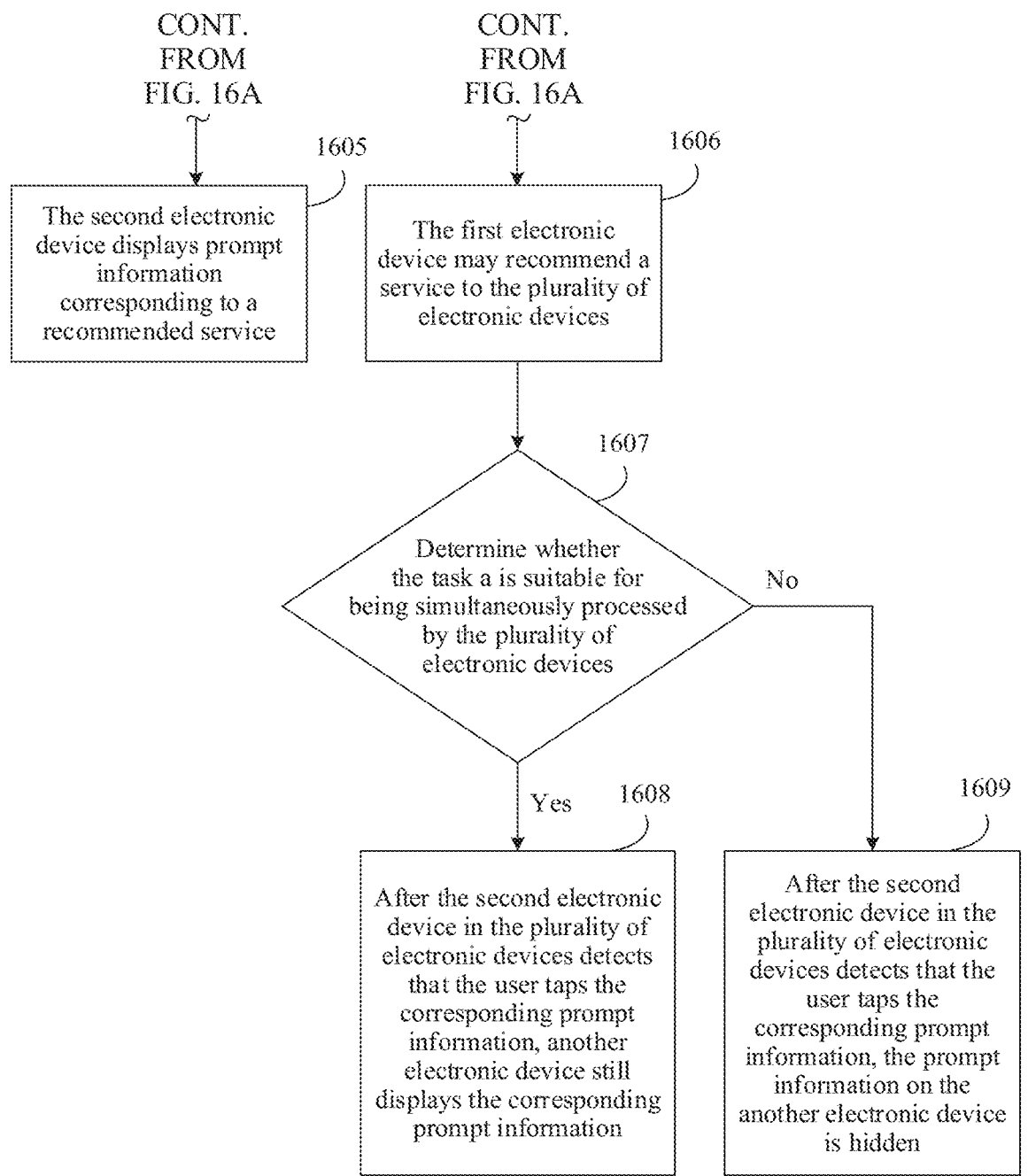

FIG. 16A and FIG. 16B are a schematic flowchart of a method 1600 for recommending a service in a cross-device manner according to an embodiment of this application. As shown in FIG. 16A and FIG. 16B, the method 1600 includes the following steps.

S1601: A first electronic device is executing a task a.

For example, as shown in FIG. 8A, the first electronic device is the smart TV, and the task a is a remote control controlling task.

For example, as shown in FIG. 9A, the first electronic device is the smart TV, and the task a is a scrolling comment sending task.

S1602: The first electronic device detects Whether there is a second electronic device that is more suitable for executing the task a within a preset distance.

It should be understood that for a process of S1602, refer to S1402 in the foregoing method 1400. For brief description, details are not described herein again.

S1603: if the first electronic device determines that there are a plurality of electronic devices that are suitable for executing the task a within the preset distance, the first electronic device displays information about the plurality of electronic devices to the user.

Figures 5A, 5B:
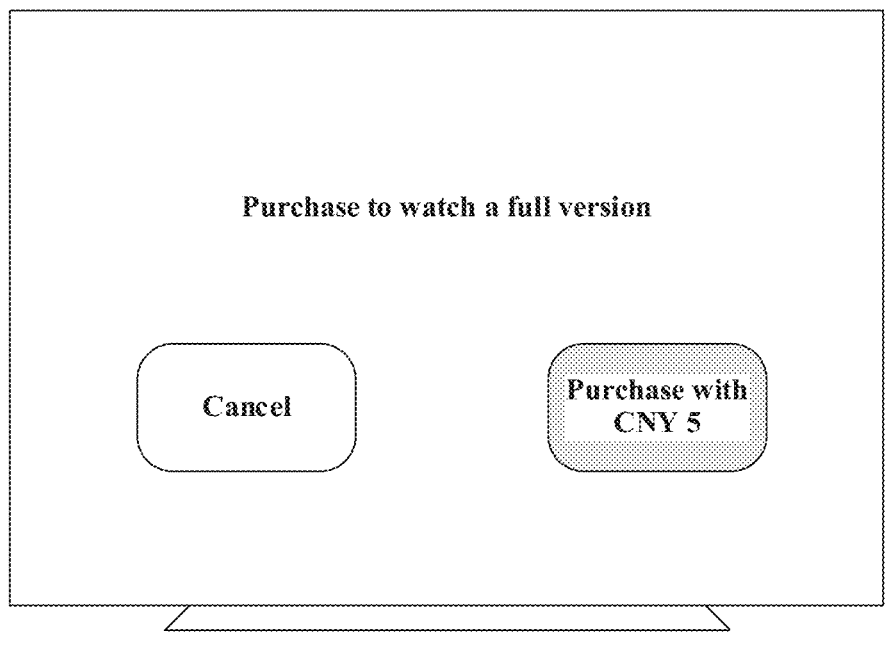
FIG. 5(a) and FIG. 5(b) show still another group of GUIs according to an embodiment of this application.

For example, as shown in FIG. 5(b), electronic devices that are suitable for executing a payment task and that are determined by the smart TV within the preset distance include Lee's P30, Laura's Mate30, and Laura's HW Watch.

S1604: The first electronic device determines whether a user specifies and selects, on the first electronic device, a device to execute the task a.

S1605: If the first electronic device determines that the user selects the second electronic device to execute the task a, the first electronic device initiates a recommended service to the second electronic device, and the second electronic device may display prompt information of the recommended service on a display.

For example, as shown in FIG. 5(b), when the smart TV determines that the user selects the Laura's Mate30 to execute the payment task, the smart TV may send a recommended service to the Laura's Mate30. In this way, prompt information of payment (for example, an icon 301) appears on a display of the Laura's Mate30.

S1606: If the first electronic device determines that the user does not select one device from the plurality of electronic devices to execute the task a, the first electronic device may recommend a service to the plurality of electronic devices, and the plurality of electronic devices may display related prompt information of a related recommended service.

Figure 3B:
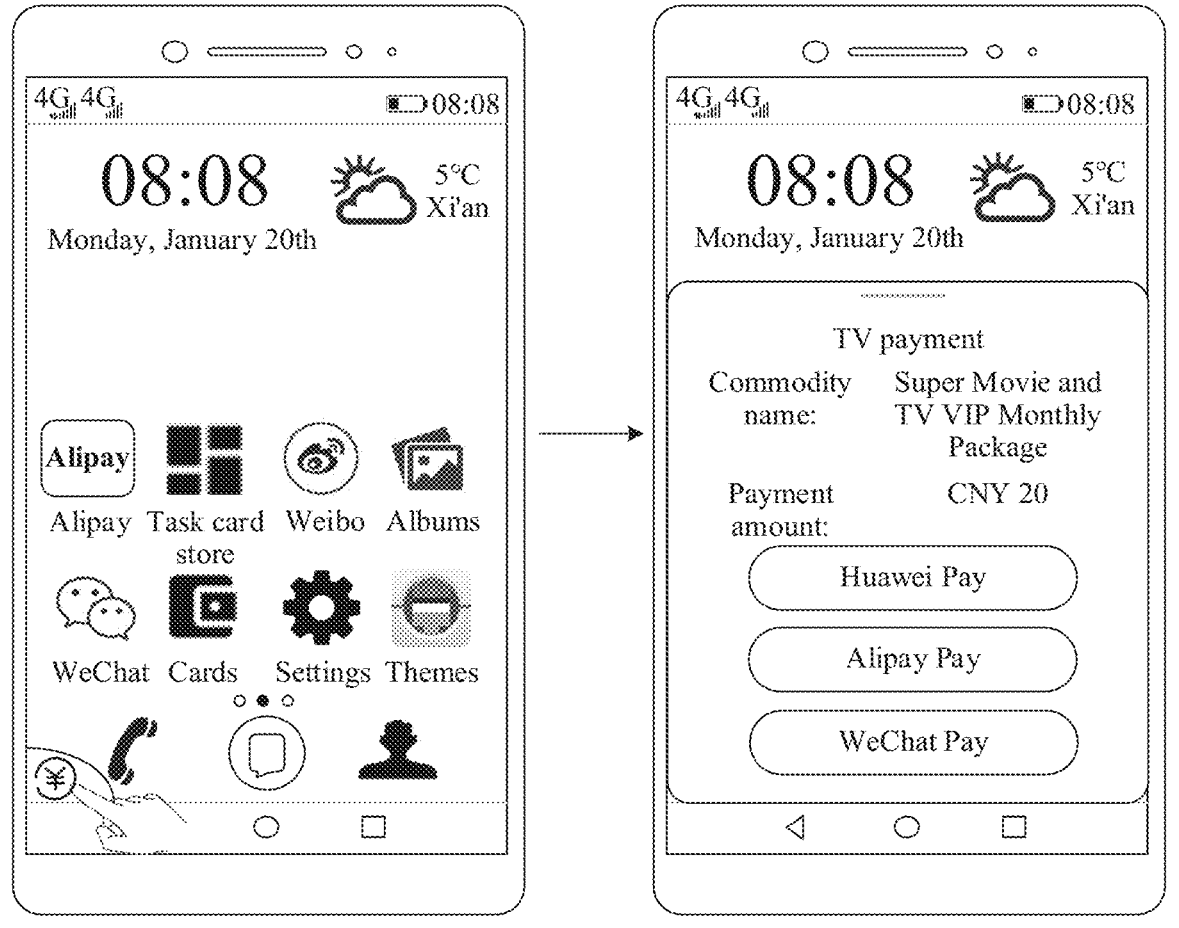
Figure 3C:
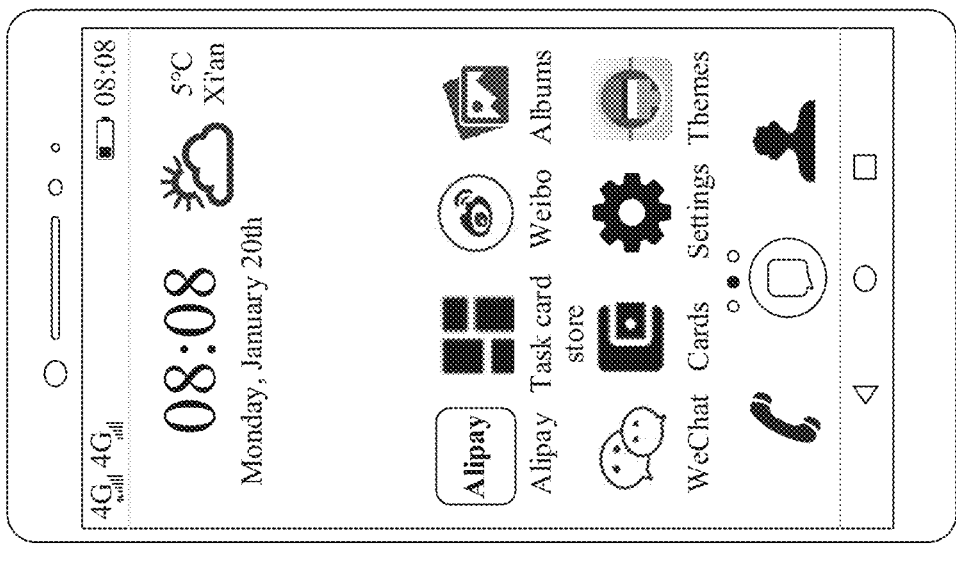
Figure 3C:
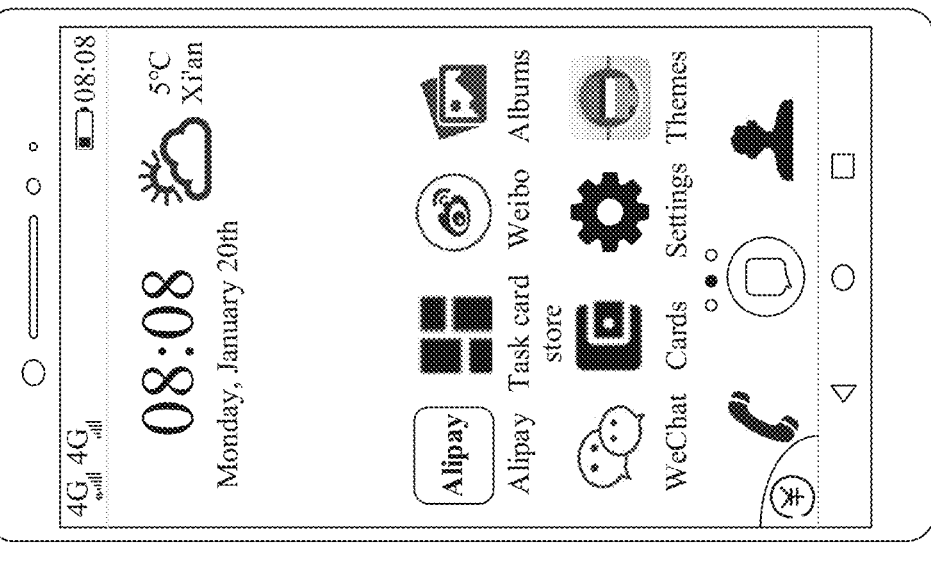

For example, the three mobile phones shown in FIG. 3(a) to FIG. 3(c) may all be mobile phones around the smart TV. The three mobile phones may all receive a recommended service sent by the smart TV, to display prompt information of payment on lower left corners of the three mobile phones.

For example, as shown in FIG. 8A, FIG. 8B, and FIG. 8C, the smart TV may send the recommended service to the mobile phone of Lee and the tablet computer of Laura. The remote control icon can be displayed on the lower left corners of the mobile phone of Lee and the tablet computer of Laura.

S1607: If the first electronic device determines that the user does not select one device from the plurality of electronic devices to execute the task a, the first electronic device continues to determine whether the task a is suitable for being simultaneously processed by the plurality of electronic devices.

For example, Table 4 shows a correspondence between a task type and whether a task is suitable for being simultaneously processed by a plurality of devices.

TABLE 4

| Task type | Suitable for being simultaneously processed by a plurality of devices or not |
|---|---|
| Payment | N |
| Authentication | N |
| Unlocking | N |
| Remote control controlling | Y |
| Scrolling comment sending | Y |
| IoT device enabling and disabling | Y |
| Notification processing | Y |
| . . . | . . . |

S1608: If the task a is suitable for being simultaneously processed by the plurality of electronic devices, after the second electronic device in the plurality of electronic devices detects that the user taps corresponding prompt information, another electronic device still displays the corresponding prompt information.

For example, as shown in FIG. 8A, FIG. 8B, and FIG. 8C, electronic devices that are suitable for performing a remote control operation and that are determined by the smart TV within a preset range include the mobile phone of Lee and the tablet computer of Laura. Because the remote control operation is suitable for being simultaneously processed by a plurality of electronic devices, the smart TV may send the recommended service to both the mobile phone of Lee and the tablet computer of Laura. Therefore, a remote control icon may appear on the mobile phone of Lee, and a remote control icon may also appear on the tablet computer of Laura.

For example, as shown in FIG. 9A, FIG. 9B, and FIG. 9C, electronic devices that are suitable for performing a scrolling comment sending operation and that are determined by the smart TV within a preset range include the mobile phone of Lee and the tablet computer of Laura. Because the scrolling comment sending operation is suitable for being simultaneously processed by a plurality of electronic devices, the smart TV may send the recommended service to both the mobile phone of Lee and the tablet computer of Laura, Therefore, a scrolling comment sending prompt icon may appear on the mobile phone of Lee, and a scrolling comment sending prompt icon may also appear on the tablet computer of Laura.

S1609: If the task a is not suitable for being simultaneously processed by the plurality of electronic devices, after the second electronic device in the plurality of electronic devices detects that the user taps the corresponding prompt information (or an icon), the prompt information (or the icon) on the another electronic device is hidden.

For example, the three mobile phones shown in FIG. 3(a) to FIG. 3(c) may all be mobile phones around the smart TV. The three mobile phones may all receive a recommended service sent by the smart TV, to display prompt information of payment on lower left corners of the three mobile phones. The payment operation shown in Table 3 is not a task type that is suitable for being simultaneously processed by a plurality of electronic devices. If the user taps the icon 301 on the mobile phone shown in FIG. 3(a), the mobile phone shown in FIG. 3(a) may send information to the mobile phone shown in FIG. 3(b) and the mobile phone shown in FIG. 3(c) to indicate that the icon 301 has been tapped on the mobile phone shown in FIG. 3(a) by the user. The mobile phones shown in FIG. 3(b) and FIG. 3(c) may hide the icons on the lower left corners.

In this embodiment of this application, the user may alternatively specify, on an original device, a device to process the task, or a plurality of devices may collaboratively process the task. In this way, it is convenient for a plurality of users around to simultaneously execute a task, thereby improving experience of the plurality of users.

Figure 17:
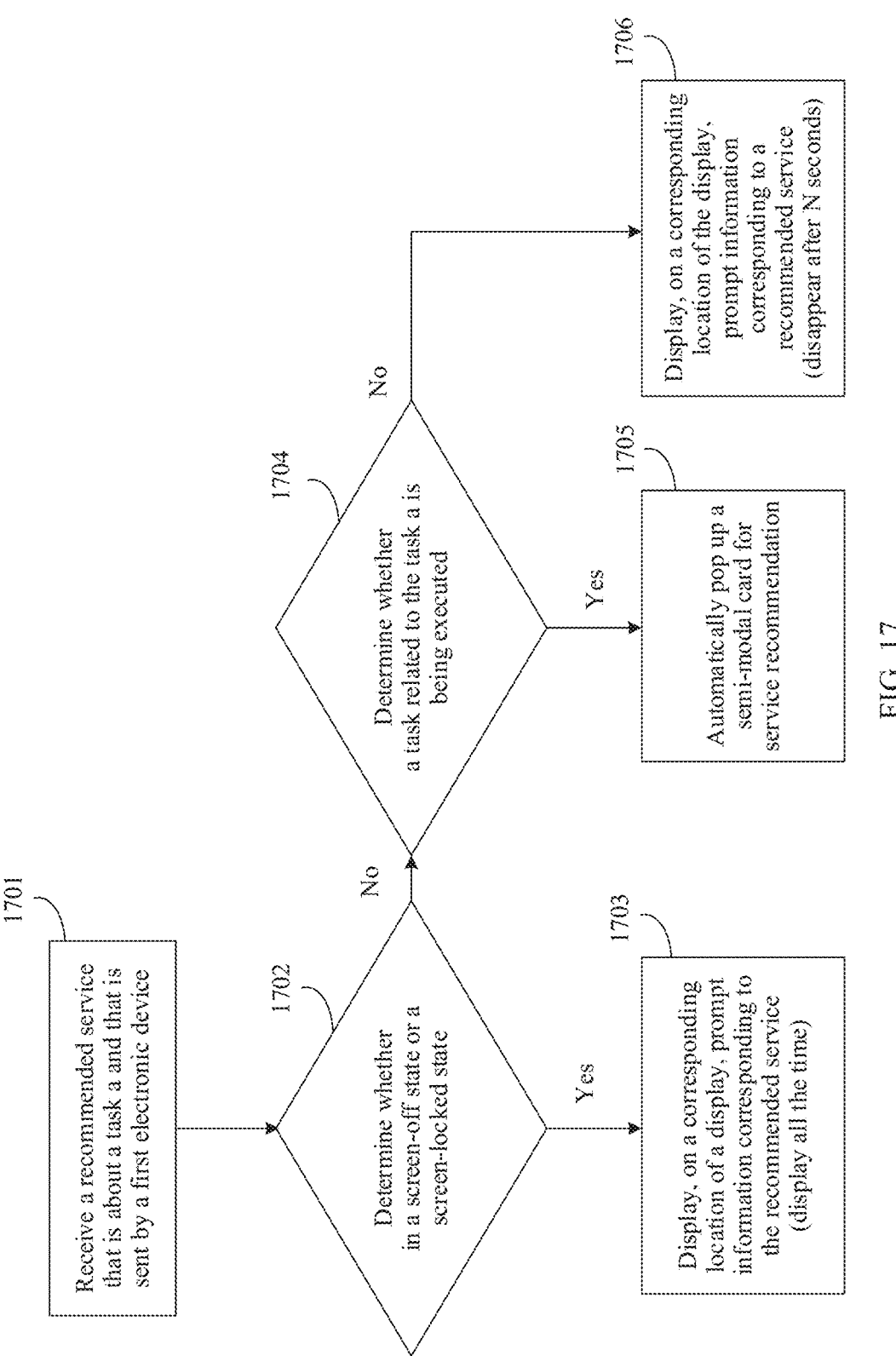
FIG. 17 is a schematic flowchart of a method for recommending a service according to an embodiment of this application.

FIG. 17 is a schematic flowchart of a method 1700 for recommending a service in a cross-device manner according to an embodiment of this application. As shown in FIG. 17, the method 1700 includes the following steps.

S1701: A second electronic device receives a recommended service that is about a task a and that is sent by a first electronic device.

For example, as shown in FIG. 3(a) to FIG. 3(c), the mobile phone receives the recommended service sent by the smart TV.

S1702: The second electronic device determines whether the second electronic device is in a screen-off state or a screen-locked state.

S1703: If the second electronic device is in the screen-off state or the screen-locked state, the second electronic device displays, on a corresponding location of a display, prompt information corresponding to the recommended service.

For example, as shown in FIG. 3(a), the mobile phone is in the screen-off state. After receiving the recommended service, the mobile phone may display the icon 301 on a lower left corner.

For example, as shown in FIG. 10(b), the mobile phone is in the screen-on and screen-locked state. After receiving the recommended service, the mobile phone may display the reminder icon on the lower left corner.

In an embodiment, if the second electronic device is in the screen-off state or the screen-locked state, the prompt information may be displayed all the time.

S1704: If the second electronic device is not in the screen-off state and is not in the screen-locked state, the second electronic device continues to determine whether the second electronic device is performing an operation related to the task a.

S1705: If the second electronic device is performing the operation related to the task a, or the second electronic device has established a connection relationship with the first electronic device before receiving the recommended service, the second electronic device may automatically pop up a semi-modal card for service recommendation.

In this embodiment of this application, the semi-modal card may display some information of the service content shown in Table 2. For example, in a payment scenario, the semi-modal card may display commodity information, a payment amount, a payment control, and the like. For another example, in a scrolling comment sending scenario, the semi-modal card may display an input box for sending a scrolling comment and information about a keyboard. For another example, in a remote control scenario, the semi-modal card may display information about a corresponding control on a smart TV.

For example, after the smart TV sends a recommended service to a mobile phone around that meets a condition, if the mobile phone determines that the mobile phone is running a payment application, the mobile phone may directly prompt a user with the payment information by using the semi-modal card.

For example, a smartphone is operating the smart TV by using a remote control function. In this case, a connection relationship has been established between the smartphone and the smart TV. After the smartphone selects an operation of "Purchase with CNN' 5" on the smart TV, the smart TV determines that payment needs to be performed at this time. In this case, the smart TV sends a recommended service corresponding to a payment task to the smartphone. Because the connection relationship has been established between the smartphone and the smart TV, the semi-modal card may be directly displayed on the smartphone. For example, a commodity name, the payment amount, and the payment control may be displayed on the semi-modal card.

For example, the smartphone is operating the smart TV by using the remote control function. In this case, the connection relationship has been established between the smartphone and the smart TV. After the smartphone taps a video playing control on the smart TV, the smart TV may play a video. In this case, the smart. TV may send a recommended service of scrolling comment sending to the smartphone. After receiving the recommended service, the smartphone may directly pop up, on a display, an input box for sending a scrolling comment in FIG. 9B. The input box includes a keyboard.

S1706: If the second electronic device currently does not perform the operation related to the task a, the second electronic device displays, on a corresponding location of the display, prompt information corresponding to the recommended service.

In an embodiment, if the second electronic device currently does not perform the operation related to the task a and the second electronic device is in a screen-unlocked state, the prompt information may appear for N seconds. If the second electronic device does not detect, after N seconds, an operation of tapping the prompt information by the user, the second electronic device may hide the prompt information.

In an embodiment, even if the user does not install an application corresponding to the task a on a carry-on device or an electronic device that is suitable for the task a, the task a can be processed on any suitable device by using a distributed AA capability.

Based on a same user ID or an associated user ID with group management, an application installed on a device can be stored on a cloud server by using a user ID, and an AA capability of the application stored on the cloud can be invoked on another device on which the application is not installed.

For example, when the smart TV is executing the payment task, the smart TV may send the recommended service to a surrounding device that is more suitable for executing the payment task. If an electronic device within a preset distance includes a smartwatch of the user and no application corresponding to a payment operation is installed on the smartwatch, in this case, the smartwatch may obtain a corresponding application from the cloud server based on the distributed AA capability. In this way, the payment operation is completed on the smartwatch.

For example, when executing the payment task, the smart TV determines that a watch in surrounding devices is a device that is suitable for executing the payment task, and the smart TV may send a payment-related recommended service to the watch. After receiving the corresponding recommended service, the watch first performs authentication on an identity of the user, for example, determine, in a manner of facial recognition or fingerprint recognition, whether the user is the user. After it is determined that the user is the user, the watch may display the recommended service corresponding to the payment task. After the watch detects that the user taps an icon corresponding to the recommended service, the watch determines that the user wants to perform the payment operation but the watch does not have a payment application (for example, Huawei Pay, WeChat, or Alipay). In this case, the watch may send, to the cloud server, information (for example, a commodity name and a commodity amount that correspond to the payment task) in the recommended service and information indicating that user authentication succeeds. After receiving the information, the cloud server may send corresponding information such as the commodity name and the commodity amount to a mobile phone, so that the mobile phone completes the payment operation. After completing the payment operation, the mobile phone may, send a payment result to the cloud server, and the cloud server sends the payment result to the watch. The watch may display a final payment result to the user.

For another example, the mobile phone may authorize a payment limit to the watch in advance. After the watch receives the recommended service sent by the smart TV, if it is determined that the commodity amount carried in the recommended service is within the payment limit, the watch may complete payment for a commodity.

A person of ordinary skill in the art may be aware that units and algorithm steps in the examples described with reference to the embodiments disclosed in this specification can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing systems, apparatuses, and units, refer to a corresponding process in the foregoing method embodiments. Details are not described herein again.

In the several embodiments provided in this application, it should be understood that the disclosed systems, apparatuses, and methods may be implemented in other manners. For example, the foregoing described apparatus embodiments are merely examples. For example, division of the units is merely a logical function division and may be another division during actual implementation. For example, a plurality of units or components may be combined or integrated into another system or some features may be ignored or may not be performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit.

When the functions are implemented in the form of a software functional unit and sold or used as an independent product, the functions may be stored in a computer-readable storage medium. Based on this understanding, the technical solutions of this application essentially, or a part contributing to the conventional technology, or some of the technical solutions may be implemented in a form of a software product. A computer software product is stored in a storage medium, and includes a plurality of instructions for instructing a computer device (which may be, for example, a personal computer, a server, or a network device) to perform all or some of the steps of the methods described in embodiments of this application. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A first electronic device comprising:

a memory configured to store instructions; and one or more processors coupled to the memory and configured to execute the instructions to cause the first electronic device to:

log in a first user identifier (ID), wherein the first electronic device stores a first mapping relationship between device types and task types that are suitable for being executed by each of the device types, wherein the device types comprise a first device type of the first electronic device and a second device type of a second electronic device, wherein the first electronic device stores a second mapping relationship between the task types and private task settings, and wherein each of the private task settings indicate whether a corresponding task type is suitable for being executed by either a third electronic device to which any user ID is logged in or a fourth electronic device to which an authorized user ID is logged in;

measure a first distance between the first electronic device and the second electronic device when a first task being executed is not suitable for being executed by the first device type based on the first mapping relationship;

receive, from the second electronic device, first information comprising a first device identifier of the second electronic device and comprising the second device type when the first distance between the first electronic device and the second electronic device is less than a preset distance;

determine, based on the first device identifier, that a second user ID logged in to the second electronic device is authorized by the first user ID, wherein the first electronic device stores a second device identifier of an electronic device associated with the second user ID and comprising the second electronic device, and wherein the first task is suitable for being executed by the second electronic device based on the second mapping relationship and based on the second user ID being authorized by the first user ID; and output, on a display and based on the second electronic device being suitable for executing the first task according to the second device type and the first mapping relationship, an interface that includes a first selectable option configured to send, to the second electronic device, a recommended service corresponding to the first task, wherein the recommended service comprises a first task type corresponding to the first task and service content.

2. The first electronic device of claim 1, wherein the second user ID is authorized by the first user ID based on the first user ID and the second user ID being in a same family group.

3. The first electronic device of claim 1, wherein the device types comprise a third device type of a fifth electronic device, and wherein the one or more processors are further configured to execute the instructions to cause the first electronic device to:

measure a second distance between the first electronic device and the fifth electronic device when the first task being executed is not suitable for being executed by the first device type based on the first mapping relationship;

compare the second distance between the first electronic device and the fifth electronic device to the preset distance;

receive, from the fifth electronic device and based on the second distance between the first electronic device and the fifth electronic device being less than the preset distance, second information comprising a third device identifier of the fifth electronic device and comprising the third device type; and store the third device identifier of the fifth electronic device, wherein a third user ID is logged into the fifth electronic device and is associated with the first user ID, wherein the interface includes, based on the third electronic device being suitable for executing the first task according to the third device type and the first mapping relationship, a second selectable option configured to send, to the fifth computing device, the recommended service corresponding to the first task.

4. The first electronic device of claim 1, wherein the interface includes a graphic configured to initiate, on an interacting device, the recommended service corresponding to the first task.

5. The first electronic device of claim 4, wherein the graphic is configured to disappear after a particular period of time elapses without a user interacting with the graphic.

6. The first electronic device of claim 1, wherein measuring the first distance comprises measure the first distance using an infrared-based or laser-based technique.

7. The first electronic device of claim 1, wherein the first electronic device is a television and the second electronic device is a watch.

8. A method for recommending a service implemented by a first electronic device, wherein the method comprises:

logging in a first user identifier (ID), wherein the first electronic device stores a mapping relationship between device types and task types that are suitable for being executed by each of the device types, wherein the device types comprise a first device type of the first electronic device and a second device type of a second electronic device, wherein the first electronic device stores a second mapping relationship between the task types and private task settings, and wherein each of the private task settings indicate whether a corresponding task type is suitable for being executed by either a third electronic device to which any user ID is logged in or a fourth electronic device to which an authorized user ID is logged in;

measuring a first distance between the first electronic device and the second electronic device when a first task being executed is not suitable for being executed by the first device type based on the first mapping relationship;

receiving, from the second electronic device, first information comprising a first device identifier of the second electronic device and the second device type when the first distance between the first electronic device and the second electronic device is less than a preset distance;

determining, based on the first device identifier, that a second user ID logged in to the second electronic device is authorized by the first user ID, wherein the first electronic device stores a second device identifier of an electronic device associated with the second user ID and comprising the second electronic device, and wherein the first task is suitable for being executed by the second electronic device based on the second mapping relationship and based on the second user ID being authorized by the first user ID; and outputting, on a display and based on the second electronic device being suitable for executing the first task according to the second device type and the first mapping relationship, an interface that includes a first selectable option configured to send, to the second electronic device, the service corresponding to the first task.

9. The method of claim 8, wherein the second user ID is authorized by the first user ID based on the first user ID and the second user ID are in a same family group.

10. The method of claim 8, wherein the device types comprise a third device type of a fifth electronic device, and wherein the method further comprises:

measuring a second distance between the first electronic device and the fifth electronic device when the first task being executed is not suitable for being executed by the first device type based on the first mapping relationship;

comparing the second distance between the first electronic device and the fifth electronic device to the preset distance;

receiving, from the fifth electronic device and based on the second distance between the first electronic device and the fifth electronic device being less than the preset distance, second information comprising a third device identifier of the fifth electronic device and comprising the third device type; and storing the third device identifier of the fifth electronic device, wherein a third user ID is logged into the fifth electronic device and is associated with the first user ID, wherein the interface includes, based on the third electronic device being suitable for executing the first task according to the third device type and the first mapping relationship, a second selectable option configured to send, to the fifth computing device, the service corresponding to the first task.

11. The method of claim 8, wherein the interface includes a graphic configured to initiate, on an interacting device, the service corresponding to the first task.

12. The method of claim 11, wherein the graphic is configured to disappear after a particular period of time elapses without a user interacting with the graphic.

13. The method of claim 8, wherein measuring the first distance comprises measuring the first distance using an infrared-based or laser-based technique.

14. The method of claim 8, wherein the first electronic device is a television and the second electronic device is a watch.

15. A computer program product comprising instructions that are stored on a non-transitory computer-readable storage medium and that, when executed by one or more processors, cause a first electronic device to:

log in a first user identifier (ID), wherein the first electronic device stores a first mapping relationship between device types and task types that are suitable for being executed by each of the device types, wherein the device types comprise a first device type of the first electronic device and a second device type of a second electronic device, wherein the first electronic device stores a second mapping relationship between the task types and private task settings, and wherein each of the private task settings indicate whether a corresponding task type is suitable for being executed by either a third electronic device to which any user ID is logged in or a fourth electronic device to which an authorized user ID is logged in;

measure a first distance between the first electronic device and the second electronic device when a first task being executed is not suitable for being executed by the first device type based on the first mapping relationship;

receive, from the second electronic device, first information comprising a first device identifier of the second electronic device and comprising the second device type when the first distance between the first electronic device and the second electronic device is less than a preset distance;

determine, based on the first device identifier, that a second user ID logged in to the second electronic device is authorized by the first user ID, wherein the first electronic device stores a second device identifier of an electronic device associated with the second user ID and comprising the second electronic device, and wherein the first task is suitable for being executed by the second electronic device based on the second mapping relationship and based on the second user ID being authorized by the first user ID; and output, on a display and based on the second electronic device being suitable for executing the first task according to the second device type and the first mapping relationship, an interface that includes a first selectable option configured to send, to the second electronic device, a recommended service corresponding to the first task, wherein the recommended service comprises a first task type corresponding to the first task and service content.

16. The computer program product of claim 15, wherein the second user ID is authorized by the first user ID based on the first user ID and the second user ID being in a same family group.

17. The computer program product of claim 15, wherein the device types comprise a third device type of a fifth electronic device, and wherein the one or more processors are further configured to cause the first electronic device to:

measure a second distance between the first electronic device and the fifth electronic device when the first task being executed is not suitable for being executed by the first device type based on the first mapping relationship;

compare the second distance between the first electronic device and the fifth electronic device to the preset distance;

receive, from the fifth electronic device and based on the second distance between the first electronic device and the fifth electronic device being less than the preset distance, second information comprising a third device identifier of the fifth electronic device and comprising the third device type; and store the third device identifier of the fifth electronic device, wherein a third user ID is logged into the fifth electronic device and is associated with the first user ID, wherein the interface includes, based on the third electronic device being suitable for executing the first task according to the third device type and the first mapping relationship, a second selectable option configured to send, to the fifth computing device, the recommended service corresponding to the first task.

18. The computer program product of claim 15, wherein the interface includes a graphic configured to initiate, on an interacting device, the recommended service corresponding to the first task.

19. The computer program product of claim 15, wherein measuring the first distance comprises measure the first distance using an infrared-based or laser-based technique.

20. The computer program product of claim 15, wherein the first electronic device is a television and the second electronic device is a watch.

* * * * *